US012394224B2

United States Patent
Wilkinson, Jr. et al.

(10) Patent No.: US 12,394,224 B2
(45) Date of Patent: Aug. 19, 2025

(54) DETECTING CELLS OF INTEREST IN LARGE IMAGE DATASETS USING ARTIFICIAL INTELLIGENCE

(71) Applicant: BlueRock Therapeutics LP, Cambridge, MA (US)

(72) Inventors: Dan Charles Wilkinson, Jr., Fremont, CA (US); Benjamin Adam Burnett, New York, NY (US)

(73) Assignee: BLUEROCK THERAPEUTICS LP, Cambridge, MA (US)

( * ) Notice: Subject to any disclaimer, the term of this patent is extended or adjusted under 35 U.S.C. 154(b) by 0 days.

(21) Appl. No.: 18/635,354

(22) Filed: Apr. 15, 2024

(65) Prior Publication Data

US 2024/0304008 A1 Sep. 12, 2024

Related U.S. Application Data

(63) Continuation of application No. 17/432,832, filed as application No. PCT/US2020/019109 on Feb. 20, 2020, now Pat. No. 11,989,960.

(Continued)

(51) Int. Cl.
*G06V 20/69* (2022.01)
*G06V 10/764* (2022.01)
(Continued)

(52) U.S. Cl.
CPC .......... *G06V 20/698* (2022.01); *G06V 10/764* (2022.01); *G06V 10/774* (2022.01);
(Continued)

(58) Field of Classification Search
CPC .... G06V 20/698; G06V 20/695; G06V 10/82; G06V 10/774; G06V 10/776; G06V 10/764

(Continued)

(56) References Cited

U.S. PATENT DOCUMENTS 9,424,459 B1   8/2016 Lange et al.
2014/0297199 A1* 10/2014 Osten ................. G01N 33/5014
                                                          435/7.1

(Continued)

FOREIGN PATENT DOCUMENTS

CN      107944360 A    4/2018
JP      2018119969 A   8/2018
(Continued)

OTHER PUBLICATIONS

Ferlaino et al., "Towards Deep Cellular Phenotyping in Placental Histology," pp. 1-19. Retrieved from the Internet: https://arxiv.org/pdf/1804.03270.pdf (2018) arXiv:1804.03270.

(Continued)

*Primary Examiner* — Mark Roz
(74) *Attorney, Agent, or Firm* — Scully, Scott, Murphy & Presser, P.C.

(57) ABSTRACT

A method for selecting a final model for detecting cells of interest in image datasets includes dividing a curated image dataset into a training set, a validation set, and a testing set where each image in the curated image dataset has been labeled as positive or negative for a cell of interest. The method trains each model of an ensemble of neural networks using the training and validation sets. Next, each model of the ensemble is tested using the testing set and the predictions of the ensemble are combined. The combined prediction is compared to the label and the method determines whether the combined prediction satisfies a pre-determined level of detection (LOD). If so, the method outputs the ensemble as a final ensemble. If not, the method modifies a hyperparameter of at least one of the models of the ensemble until the combined prediction satisfies the pre-determined LOD.

13 Claims, 13 Drawing Sheets

Related U.S. Application Data

(60) Provisional application No. 62/808,054, filed on Feb. 20, 2019.

(51) Int. Cl.
*G06V 10/774* (2022.01)
*G06V 10/776* (2022.01)
*G06V 10/82* (2022.01)

(52) U.S. Cl.
CPC ............ *G06V 10/776* (2022.01); *G06V 10/82* (2022.01); *G06V 20/695* (2022.01)

(58) Field of Classification Search
USPC .......................................................... 382/133
See application file for complete search history.

(56) References Cited

U.S. PATENT DOCUMENTS

| | | | | |
|---|---|---|---|---|
| 2017/0356976 | A1* | 12/2017 | Shapiro | G06V 10/82 |
| 2018/0211380 | A1* | 7/2018 | Tandon | G06V 20/69 |
| 2019/0303760 | A1* | 10/2019 | Kumar | G06V 10/82 |
| 2020/0160032 | A1* | 5/2020 | Allen | G16H 50/30 |

FOREIGN PATENT DOCUMENTS

| | | | |
|---|---|---|---|
| WO | 2015054666 | A1 | 4/2015 |
| WO | 2015195780 | A1 | 12/2015 |
| WO | 2017091147 | A1 | 6/2017 |
| WO | 2018207334 | A1 | 11/2018 |
| WO | 2019113535 | A1 | 6/2019 |
| WO | 2019178561 | A2 | 9/2019 |

OTHER PUBLICATIONS

Gao et al., "HEp-2 Cell Image Classification With Deep Convolutional Neural Networks," pp. 1-32. Retrieved from the Internet: https://arxiv.org/abs/1504.02531v2 (2015) arXiv:1504.02531v2.

Perkinelmer, "Analysis of Stem Cell Differentiation using the Operetta High Content Imaging System," pp. 1-4, Application Note, Nov. 2011. Retrieved from the Internet on Jun. 7, 2022. https://resources.perkinelmer.com/lab-solutions/resources/docs/analysis_stem_cell_differentiation_using_operetta.pdf.

Perkinelmer, "Operetta CLS High Content Analysis System" [Website], 13 pages. Retrieved from the Internet on Jun. 8, 2022. https://www.perkinelmer.com/category/operetta-cls-high-content-analysis-system.

Wahab et al., "Two-phase deep convolutional neural network for reducing class skewness in histopathological images based breast cancer detection," Computers in Biology and Medicine (2017) 85:86-97.

Zhou et al., "Lung cancer cell identification based on artificial neural network ensembles," Artificial Intelligence in Medicine (2002) 24:25-36.

Search Report and Written Opinion from International Patent Application No. PCT/US2020/019109, Jun. 5, 2020, 17 pages.

Notice of Grounds for Rejection dated Dec. 15, 2023 received in Japanese Patent Application No. 2021-548192, 12 pages.

Office Action dated Sep. 11, 2023 received in European Patent Application No. 20712758.0, 7 pages.

Komoto, K., et al., "A Performance Evaluation of Defect Detection by using Denoising AutoEncoder Generative Adversarial Networks", 2018 International Workshop on Advanced Image Technology (IWAIT), Jan. 7, 2018, 4 pages.

European Examination Report issued in EP Application No. 20712758.0 dated Apr. 29, 2025, 11 pages.

\* cited by examiner

DETECTING CELLS OF INTEREST IN LARGE IMAGE DATASETS USING ARTIFICIAL INTELLIGENCE

CLAIM OF PRIORITY

This application is a continuation of U.S. patent application Ser. No. 17/432,832 filed on Aug. 20, 2021, which is a National Stage Entry of PCT International Application Serial No. PCT/US2020/019109 filed on Feb. 20, 2020, which claims priority from U.S. Provisional Patent Application No. 62/808,054, filed on Feb. 20, 2019, which is incorporated herein by reference in its entirety.

BACKGROUND

Accurate identification of specific cells, such as rare cell phenotypes, in images is crucial to enable early detection of associated diseases, so that appropriate treatment can begin and outcomes can be improved. Detecting rare cell phenotypes in large image datasets is challenging, however, because standard analytical methods are usually plagued by false positives. In addition, these datasets usually contain thousands of images, which preclude a trained expert from manually analyzing these images in a reasonable amount of time. Furthermore, standard methods that are efficient at excluding false positives require a high degree of fine tuning that may bias the results and lead to false negatives.

Figure 1:
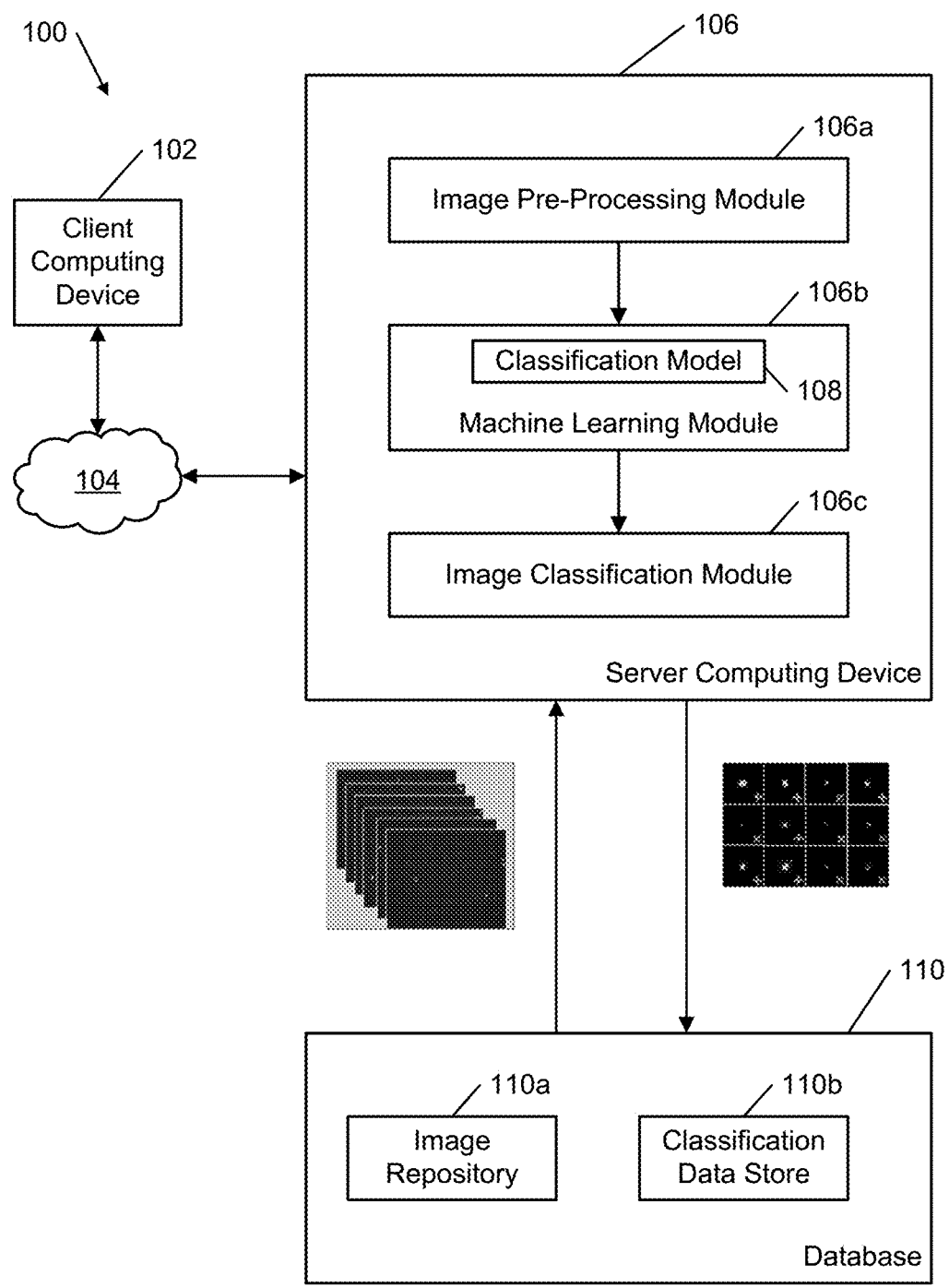
FIG. 1 is a block diagram of a system for identifying a cell of interest in a plurality of stained histological images, according to an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Conventionally, cell detection may be performed by standard segmentation algorithms including thresholding, edge detection, and watershed approaches. Typically, such algorithms are used in series—but these algorithms tend to include many false positives. In addition, plate imperfections and small flecks of auto-fluorescent debris that are in the same size range of the cells that are of interest are often classified as a positive hit.

The techniques described herein detect cells of interest in large image datasets using accurate, automated image thresholding, segmentation, and classification to rapidly identify whether an input image includes one or more cells of interest. These techniques provide a failsafe approach to detection which many conventional methods do not, by initially detecting all pixel regions with an enriched pixel density and further analyzing these regions—ensuring that no true positive cell of interest is overlooked.

One embodiment of the present invention identifies a cell of interest in a plurality of stained histological images. A server receives the images containing one or more independent channels. The server binarizes pixel values of the independent channels in each of the images. The server determines one or more areas of interest in the binarized images by finding pixel areas in the independent channels that are connected and make up an overall connected pixel area of a certain size, each area of interest defined by bounding coordinates. The server crops each area of interest in the images based upon the bounding coordinates to generate a set of sub-images each comprising a cropped area of interest. The server trains an image classification model using the classified sub-images to generate a trained image classification model. The server executes the trained image classification model using the set of sub-images as input to classify each sub-image into at least one of two or more categories that predicts or indicates whether the sub-image includes a cell of interest. The server stores data relating to classification of the set of sub-images by the trained image classification model in one or more data stores.

In some embodiments, binarizing pixel values of one or more of the independent channels in each of the images includes applying a first fluorescent channel of the independent channels to each of the images to generate a set of first fluorescent channel images; applying a second fluorescent channel of the independent channels to each of the images to generate a set of second fluorescent channel images; merging each image in the set of first fluorescent channel images with a corresponding image in the set of second fluorescent channel images to generate a set of merged images; and binarizing pixel values of the first fluorescent channel and the second fluorescent channel in each image of the set of merged images. In some embodiments, the server applies a third fluorescent channel of the independent channels to each of the images to generate a set of third fluorescent channel images; merges each image in the set of third fluorescent channel images with a corresponding image in the set of merged images; and binarizes pixel values of the first fluorescent channel, the second fluorescent channel, and/or the third fluorescent channel in each image of the set of merged images. In some embodiments, the server applies a brightfield channel of the independent channels to each of the images to generate a set of brightfield channel images; merges each image in the set of brightfield channel images with a corresponding image in the set of merged images; and binarizes pixel values of the first fluorescent channel, the second fluorescent channel, the third fluorescent channel, and/or the brightfield channel in each image of the set of merged images.

In some embodiments, the cells of interest include cells having multiple phenotypic characteristics. In some embodiments, the cells of interest include OCT4+ cells, OCT4− cells, or both. In some embodiments, the cells of interest include pluripotent stem cells (PSCs). In some embodiments, the PSCs are induced pluripotent stem cells (iPSCs) or embryonic stem cells (ESCs). In some embodiments, the PSCs include OCT4+ cells.

In some embodiments, the bounding coordinates include extrema coordinates of the area of interest. In some embodiments, the extrema coordinates include one or more north coordinates of the area of interest, one or more south coordinates of the area of interest, one or more east coordinates of the area of interest, and one or more west coordinates of the area of interest. In some embodiments, the area of interest includes a region of interconnected pixels that have a value equal to one after binarization.

In some embodiments, storing data relating to classification of the set of sub-images by the trained image classification model in one or more data stores includes storing one or more of the sub-images classified as containing a cell of interest in a first data store and storing one or more of the sub-images classified as not containing a cell of interest event in a second data store. In some embodiments, one or more of the first data store and the second data store is a local data store. In some embodiments, one or more of the first data store and the second data store is a remote data store connected to the server computing device via a communication network. In some embodiments, the data relating to classification of the set of sub-images includes text data indicating a classification value for each sub-image in the set of sub-images.

In some embodiments, the trained image classification model includes a convolutional neural network having a plurality of layers, each layer including a plurality of 2D convolutional filters and each 2D convolutional filter including a 3×3 matrix of pixel values. In some embodiments, the trained image classification model includes a plurality or ensemble of convolutional neural networks. In this case, each of the convolutional neural networks independently uses the set of sub-images as input to classify each sub-image as either containing a cell of interest or not containing a cell of interest, and the server merges data relating to classification of the set of sub-images from each of the convolutional neural networks to classify each sub-image as either containing a cell of interest or not containing a cell of interest. Training a plurality or an ensemble of neural networks may result in using one trained image classification model in the classification or deployment stage or it may result in using two or more neural networks in an ensemble fashion in the classification or deployment stage. Merging of the data by the server may lead to using another classification method to make a final decision regarding the classification of the sub-image. This other classification method may include a voting or stacking technique or a combination of voting and/or stacking techniques. The other classification method may also be evaluated to determine which one or ones performs the best (i.e., selects the correct image classification), and then that classification method may be used during deployment as well.

In some embodiments, at least a portion of the images depicts one or more cells of interest. In some embodiments, the server receives a second plurality of stained histological images containing one or more independent channels, where the second plurality of stained histological images do not depict any cells of interest; binarizes pixel values of one or more of the independent channels in each of the second plurality of stained histological images; trains an image autoencoder using the second plurality of stained histological images as input to identify a background signal of the second plurality of stained histological images; and executes the trained image autoencoder on the plurality of stained histological images to remove background noise from the plurality of stained histological images prior to binarization.

In some embodiments, each sub-image in the set of sub-images is classified into at least one of two or more categories by an expert. In some embodiments, the expert labels each sub-image using at least one of the two or more categories. In some embodiments, after the image classification model is trained, the expert analyzes classification results of the image classification model to determine whether further training of the image classification model is required. In some embodiments, when further training of the image classification model is required, the server computing device trains the image classification model using one or more misclassified sub-images as part of a training pool.

Reference is now made to FIG. 1, which is a block diagram of a system 100 for identifying a cell of interest in a plurality of stained histological images, according to an embodiment of the present invention. System 100 includes a client computing device 102, a communications network 104, a server computing device 106 that includes an image pre-processing module 106a, a machine learning module 106b, and an image classification module 106c. Machine learning module 106b includes a classification model 108 (also called "trained image classification model") that is trained to classify areas of interest in one or more sub-images, generated from the stained histological images, into at least one of two or more categories that indicate whether the sub-image includes a cell of interest. System 100 further includes a database 110 that has an image repository 110a and a classification data store 110b.

Client computing device 102 connects to communications network 104 in order to communicate with server computing device 106 to provide input and receive output relating to the process of identifying a cell of interest in a plurality of stained histological images as described herein. In some embodiments, client computing device 102 is coupled to a display device (not shown). For example, client computing device 102 can provide a graphical user interface (GUI) via the display device that presents output (e.g., sub-images and/or image classification data generated by system 100) resulting from the methods and systems described herein. Exemplary client computing devices 102 include but are not limited to desktop computers, laptop computers, tablets, mobile devices, smartphones, and internet appliances. It should be appreciated that other types of computing devices that are capable of connecting to the components of system 100 can be used without departing from the scope of the technology described herein. Although FIG. 1 depicts a single client computing device 102, it should be appreciated that system 100 may include any number of client computing devices.

Communications network 104 enables client computing device 102 to communicate with server computing device 106. Network 104 is typically a wide area network, such as the Internet and/or a cellular network. In some embodiments, network 104 is composed of several discrete networks and/or sub-networks (e.g., cellular to Internet). In some embodiments, communications network 104 enables server computing device 106 to communicate with database 110.

Server computing device 106 is a device that includes specialized hardware and/or software modules that execute on a processor and interact with memory modules of server computing device 106, to receive data from other components of system 100, transmit data to other components of system 100, and perform functions for identifying a cell of interest in a plurality of stained histological images as described herein. Server computing device 106 includes several computing modules 106a, 106b, 106c that execute on the processor of server computing device 106. In some embodiments, modules 106a, 106b, 106c are specialized sets of computer software instructions programmed onto one or more dedicated processors in server computing device 106 and may include specifically-designated memory locations and/or registers for executing the specialized computer software instructions.

Although modules 106a, 106b, 106c are shown in FIG. 1 as executing within the same server computing device 106, in some embodiments the functionality of modules 106a, 106b, 106c may be distributed among a plurality of server computing devices. As shown in FIG. 1, server computing device 106 enables modules 106a, 106b, 106c to communicate with each other in order to exchange data for the purpose of performing the described functions. It should be appreciated that any number of computing devices, arranged in a variety of architectures, resources, and configurations (e.g., cluster computing, virtual computing, cloud computing) may be used without departing from the scope of the technology described herein. The exemplary functionality of modules 106a, 106b, 106c is described in detail below.

In some embodiments, classification model 108 in machine learning module 106b includes a convolutional neural network (CNN). A CNN has an input layer and an output layer, as well as hidden layers in between. Each layer includes a plurality of 2D convolutional filters and each 2D convolutional filter includes a 3×3 matrix of pixel values. In some embodiments, classification model 108 includes a plurality or ensemble of CNNs, where each CNN may independently use sub-images as input to classify the sub-images into one of two or more categories that indicate whether the sub-image includes a cell of interest. Machine learning module 106b can then merge the classification data from each convolutional neural network into an overall classification of the sub-image. This ensemble architecture is further discussed below. Machine learning module 106b may be implemented using the TensorFlow machine learning software library (available at https://www.tensorflow.org) in conjunction with the Keras neural networks API (available at https://keras.io). It should be appreciated that other machine learning libraries and frameworks, such as Theano (available from https://github.com/Theano/Theano) may be used within the scope of the technology described herein.

Database 110 is a computing device (or, in some embodiments, a set of computing devices) coupled to server computing device 106 and is configured to receive, generate, and store specific segments of image data and classification data relating to the process of identifying a cell of interest in a plurality of stained histological images as described herein. In some embodiments, all or a portion of database 110 may be integrated with server computing device 106 or be located on a separate computing device or devices. Database 110 may include one or more data stores (e.g., image repository 110a, classification data store 110b) configured to store portions of data used by the other components of system 100, as will be described in greater detail below. In some embodiments, database 110 may include relational database components (e.g., SQL, Oracle®, etc.) and/or file repositories.

Each of image repository 110a and classification data store 110b is a dedicated section of database 110 that contains specialized data used by the other components of system 100 to identify a cell of interest in a plurality of stained histological images as described herein. Further detail on image repository 110a and classification data store 110b is provided below. It should be appreciated that in some embodiments, image repository 110a and classification data store 110b may be located in separate databases (not shown).

Figure 2:
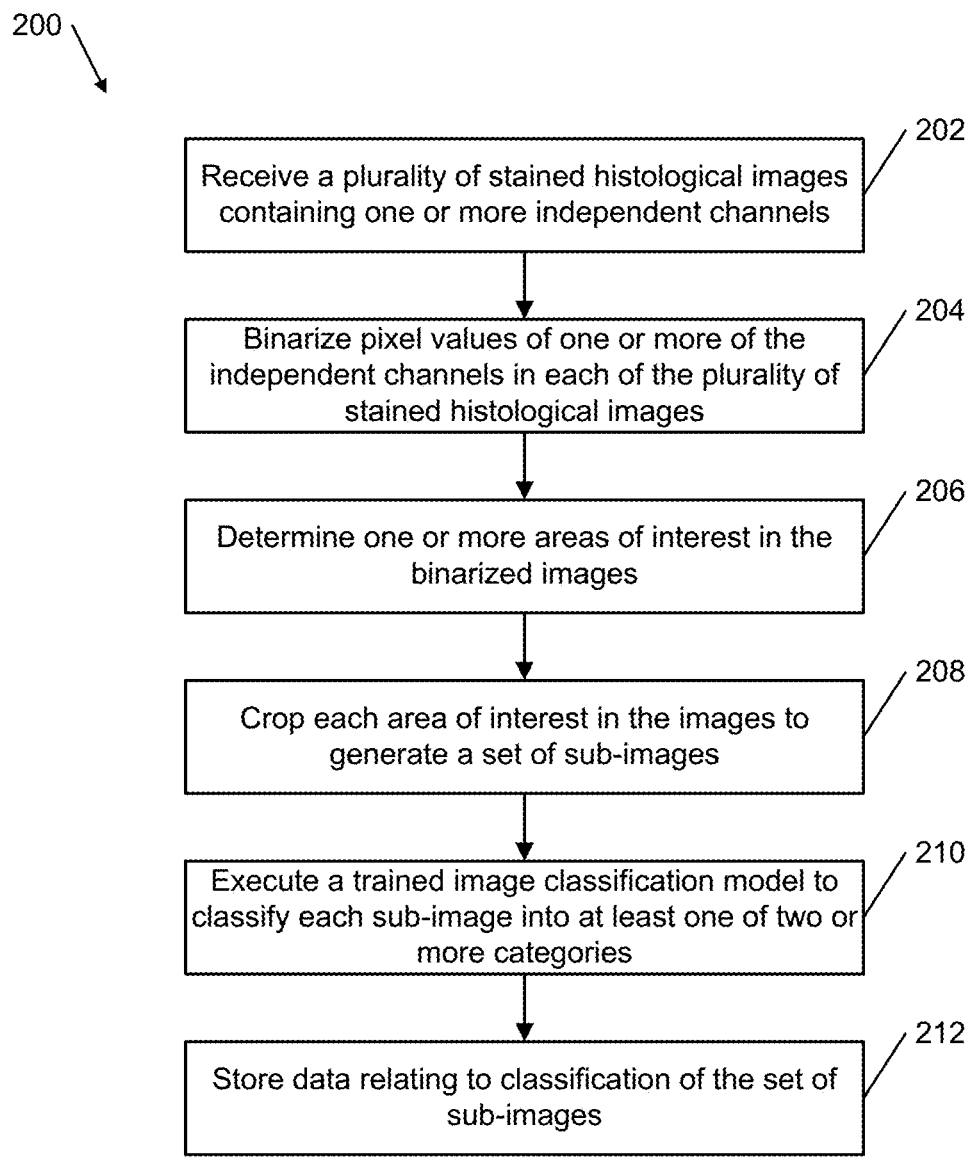
FIG. 2 is a flow diagram of a method for identifying a cell of interest in a plurality of stained histological images, according to an embodiment of the present invention.
Figure 3:
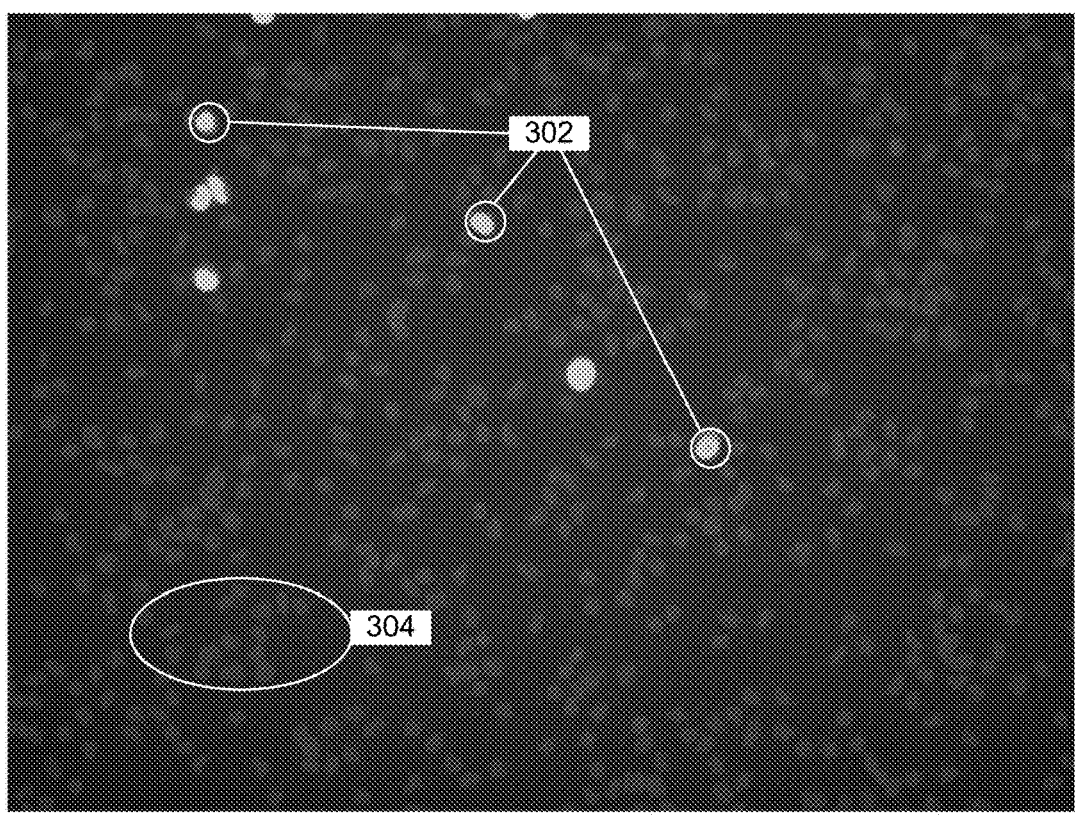
FIG. 3 is a stained histological image, according to an embodiment of the present invention.

FIG. 2 is a flow diagram of a computerized method 200 for identifying a cell of interest in a plurality of stained histological images, using system 100 of FIG. 1, according to an embodiment of the present invention. In operation 202, image pre-processing module 106a receives a plurality of stained histological images containing one or more independent channels. For example, image pre-processing module 106a may receive the images from, e.g., image repository 110a or from another data source that is external to image pre-processing module 106a (such as a data store located in the memory of server computing device 106). In some embodiments, the stained histological images are immunofluorescent images, at least some of which contain one or more cells of interest. FIG. 3 is a stained histological image, according to an embodiment of the present invention, received as input by image pre-processing module 106a. As shown in FIG. 3, the image includes a plurality of cells—including some cells that are dark gray (e.g., 304) indicating a first independent channel and some cells that are light gray (e.g., 302) indicating a second independent channel.

Typically, a set of images includes hundreds (or thousands) of images captured from laboratory experiments directed to certain types of cells and/or from pathology studies or examinations of actual patients. For example, the stained histological images may be collected from a spike-in experiment in which cells of interest having a first phenotype are added to a cell culture comprising cells of a second phenotype at various dilutions. In one example spike-in experiment, OCT4+ pluripotent stem cells (PSCs) (the first phenotype) were added to a culture of embryonic stem cell (ESC)-derived neurons (the second phenotype) at several different dilutions. The spike-in experiment may be quantitative, allowing various detection methods to be compared with known spike-in percentages. The phenotypic identity may be assessed by immunostaining for a marker or markers specific to the cell of interest, and a fluorescent signal collected from these markers may be encoded in the channel(s) of interest. It should be appreciated that one channel, or several channels, may be applied to the raw stained histological images. For example, the channels may include a plurality of independent fluorescent channels (such as RGB) and/or a brightfield or white light channel, each of which is applied to the input images. In some embodiments, there are 2, 3, 4, 5, 6, 7, or 8 independent channels. In some embodiments, image pre-processing module 106a can merge images that have a first independent channel applied with corresponding images that have a second independent channel applied to generate a set of merged images, which are then processed (e.g., binarization, determining areas of interest, cropping) as described below.

As described herein, cells of interest are generally cells that exhibit certain characteristics or attributes, and system 100 seeks to identify these cells of interest from within one or more of the input images. In some embodiments, the cells of interest include cells having multiple phenotypic characteristics (such as OCT4+ cells or OCT4− cells). In some embodiments, the cells of interest include PSCs (such as induced pluripotent stem cells (iPSCs) or embryonic stem cells (ESCs)). In some embodiments, the cells of interest express one or more pluripotency-associated markers, such as OCT4, Tra-1-60/81, SOX2, FGF4, and/or SSEA-3/4. In some embodiments, the cells of interest are an impurity in a cell population. An impurity generally means a cell type and/or genotype other than an expected cell type and/or genotype. Impurities can be either product- or process-related residual contaminants that may be detected in the final product, such as residual undifferentiated cells, transformed cells, or off-target cell types. Cellular impurities may pose safety issues; highly sensitive assays are used to detect these impurities. In some embodiments, impurities are expected to occur rarely.

For example, in some embodiments, the one or more input images depict at least a portion of a population of cardiomyocytes and the cells of interest are non-cardiomyocytes, such as pacemaker cells, fibroblasts, and/or epicardial cells, where the non-cardiomyocytes express one or more markers that are not expressed by the cardiomyocytes. In some embodiments, the input images depict at least a portion of a population of dopaminergic neurons and/or progenitors and the cells of interest are non-dopaminergic neurons and/or progenitors, such as oculomotor neurons and/or serotonergic neurons, the non-dopaminergic neurons and/or progenitors expressing one or more markers that are not expressed by the dopaminergic neurons and/or progenitors. In some embodiments, the input images depict at least a portion of a population of macrophages having a desired phenotype and the cells of interest are macrophages that lack the desired phenotype, where the desired phenotype corresponds to one or more markers that are expressed by the macrophages having the desired phenotype and are not expressed by the macrophages lacking the desired phenotype. In some embodiments, the input images depict at least a portion of a population of cells having a desired genotype (e.g., a desired gene copy number or desired gene sequence), and the cells of interest are cells that lack the desired genotype (e.g., a variation on the desired gene copy number or a mutation in the desired gene sequence), the desired genotype corresponding to one or more markers that are expressed by the cells having the desired genotype and are not expressed by the cells lacking the desired genotype. It should be appreciated that the above-described cell types are exemplary, and the techniques described herein can be applied for detection of a wide variety of different cells of interest from within input images.

Figure 4:
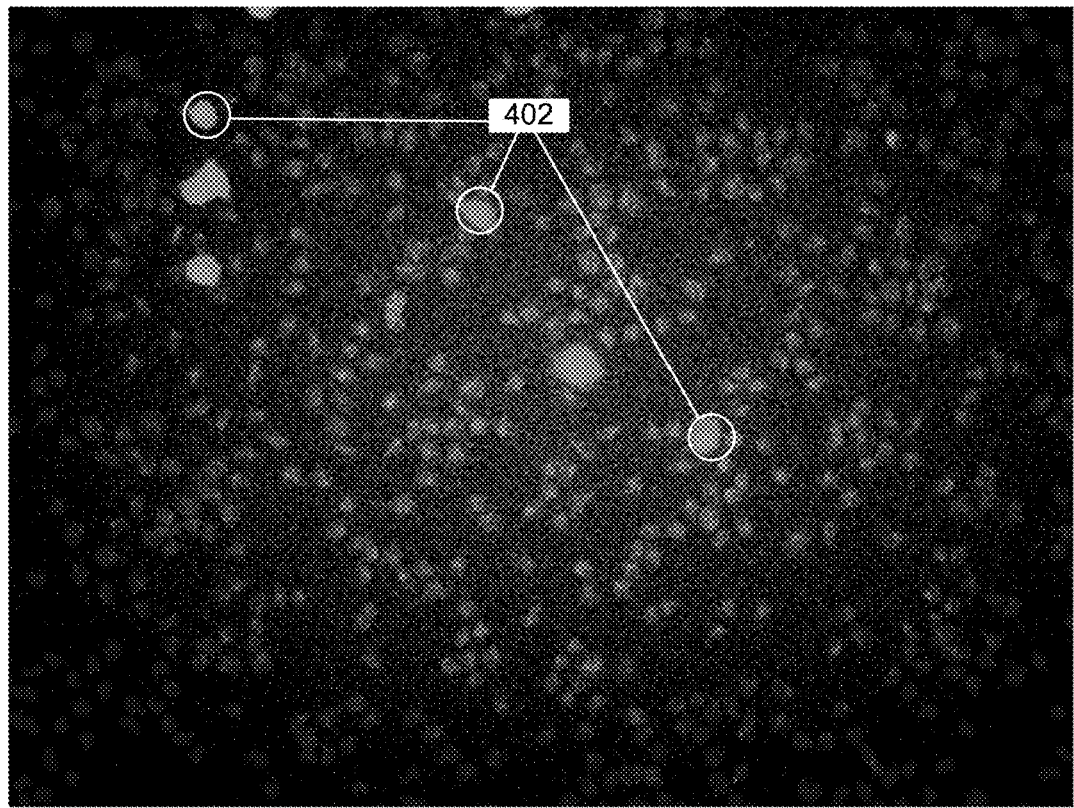
FIG. 4 is a stained histological image after binarization, according to an embodiment of the present invention.

Referring again to FIG. 2, in operation 204, image pre-processing module 106a binarizes pixel values of one or more of the independent channels in each of the stained histological images—including but not limited to pixel values associated with regions in each image that have a low signal-to-noise ratio. In some embodiments, image pre-processing module 106a can utilize the OpenCV image manipulation library (available at https://opencv.org) to perform the binarization process (also called thresholding). Generally, during the binarization process, image pre-processing module 106a changes the pixel value of certain pixels that have a value at or below a predetermined threshold to zero, and changes the pixel value of certain pixels that have a value above the predetermined threshold to one. In one embodiment, image pre-processing module 106a maps low-intensity pixels (i.e., pixels with a pixel value below the threshold) to zero and then maximizes the spread of the intensity value histogram, for the independent channel(s) in each image. Then, image pre-processing module 106a erodes the independent channel(s) in each image to remove small-area interconnected pixel regions. As described herein, an interconnected pixel region includes a plurality of pixels in proximity to each other (e.g., by touching edges and/or corners), at least some of which share the same or substantially similar pixel value, so as to appear as a single region within the image. Image pre-processing module 106a can be configured to remove interconnected pixel regions that have an area known to be smaller than a cell of interest. FIG. 4 is an example of a stained histological image (i.e., the image of FIG. 3) after binarization. As shown in FIG. 4, the binarization process described above results in certain areas of the image (e.g., areas 402, which correspond to areas 302 of FIG. 3) as appearing more prominent—potentially indicating a cell of interest.

Figure 5:
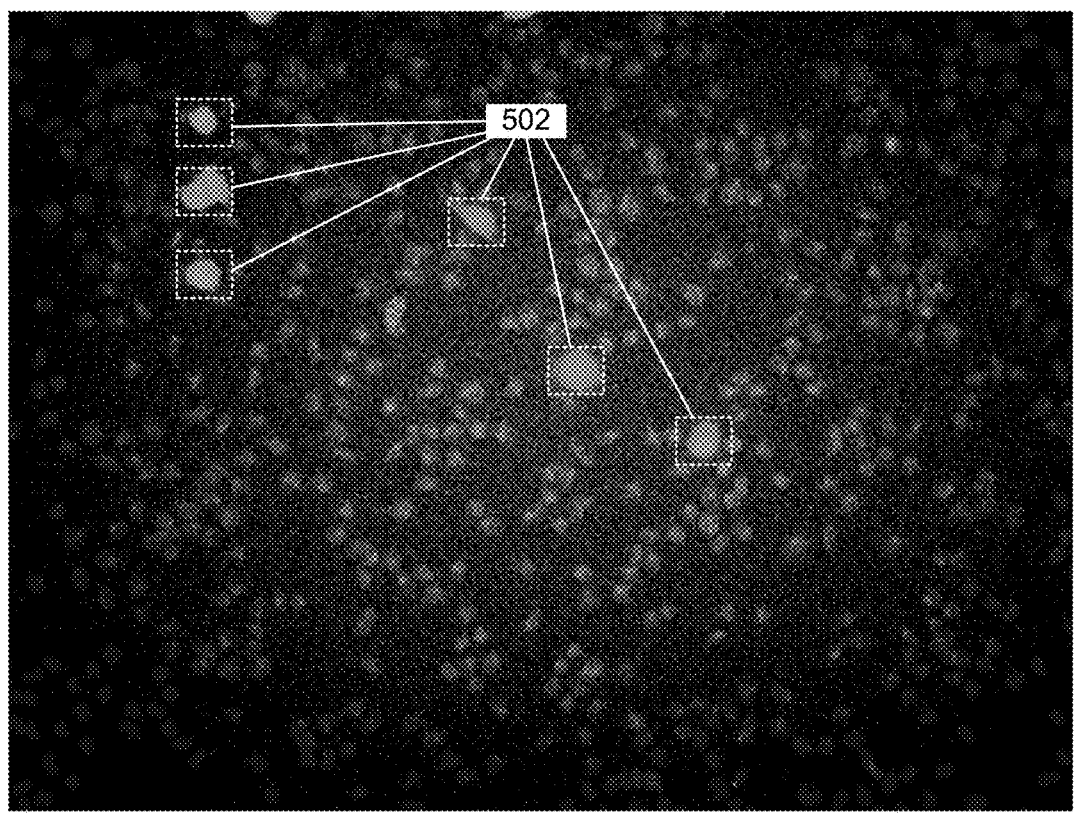
FIG. 5 is a stained histological image after binarization, showing the determined areas of interest, according to an embodiment of the present invention.

Once image pre-processing module 106a has binarized the pixel values, in operation 206, module 106a determines one or more areas of interest in the binarized images by finding pixel areas in the independent channels that are connected and include an overall connected pixel area of a certain size. It should be appreciated that image pre-processing module 106a considers pixel areas in each image, including but not limited to discrete areas that have a low signal-to-noise ratio. As noted above, image pre-processing module 106a can be configured to identify certain pixel areas in the binarized image that may include a cell of interest due to the connectivity of pixels (e.g., all of the pixels in the interconnected region have a pixel value of one) in the pixel area and overall size of the pixel area. For example, OCT4+ cells may be known to have a certain size, and image pre-processing module 106a may only select areas of interest in the binarized image that meet or exceed the size threshold. FIG. 5 is an example of a stained histological image after binarization (e.g., the image of FIG. 4), showing exemplary areas of interest 502 identified by image pre-processing module 106a in operation 206. Generally, each area of interest is defined by one or more bounding coordinates—that is, coordinates in the image that describe the boundaries of the area of interest. In one embodiment, the bounding coordinates include extrema coordinates of the area of interest—such as north coordinates, south coordinates, cast coordinates, and/or west coordinates. Image pre-processing module 106a can capture the statistics associated with the determined areas of interest (i.e., bounding coordinates and size). In some embodiments, image pre-processing module 106a stores the captured statistics in database 110.

Figure 6:
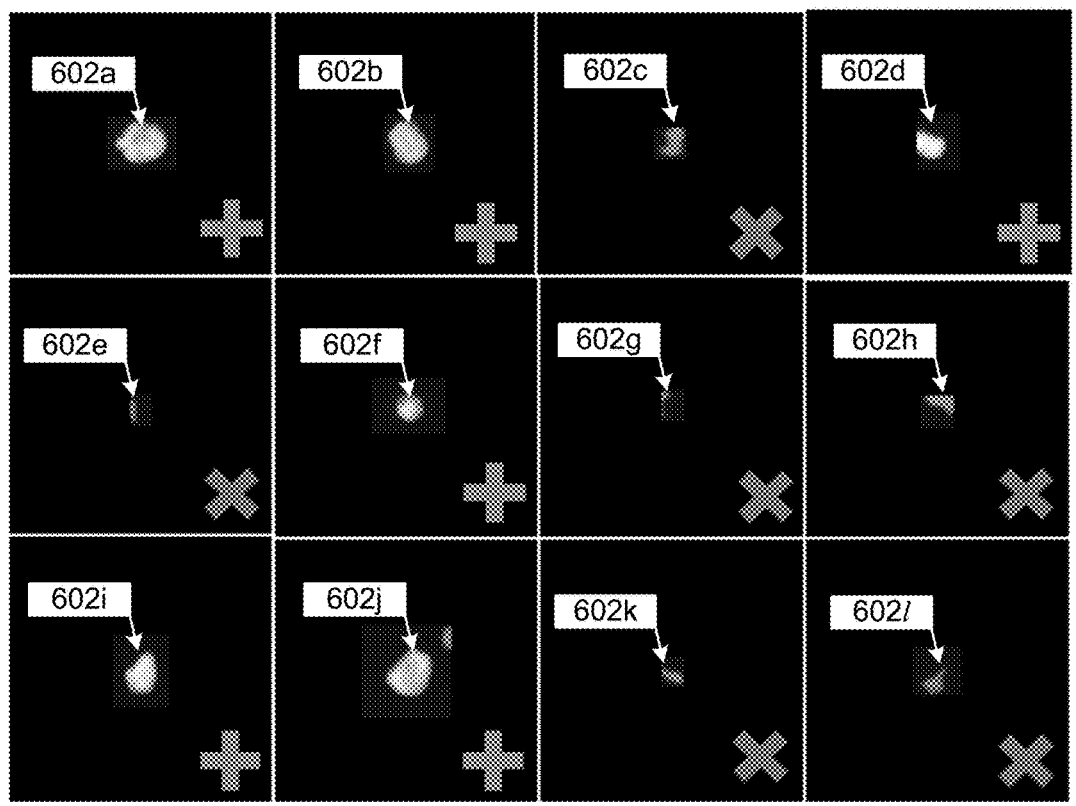
FIG. 6 is a set of sub-images comprising areas of interest determined from the binarized image, according to an embodiment of the present invention.

In operation 208, image pre-processing module 106a then crops each area of interest in the images based upon the bounding coordinates to generate a set of sub-images, each including a cropped area of interest. In some embodiments, image pre-processing module 106a may use the OpenCV image manipulation library (available at https://opencv.org) to perform the cropping process. FIG. 6 is an example of a plurality of sub-images 602a-602l that include cropped areas of interest from a binarized image (e.g., the image of FIG. 5). As shown in FIG. 6, each sub-image 602a-602l includes a region of interconnected pixels (shown as light gray). It should be noted that the sub-images do not include the entire respective black box, but rather only the small portion denoted by each arrow. In some embodiments, image processing module 106a pads some or all of the sub-images 602a-602l with zeroes, such that each resulting padded image includes the same dimensions. For example, image processing module 106a may resize the padded images to be 256×256 pixels.

It should also be appreciated that the pixel regions in sub-images 602a-602l are potential cells of interest—which can include true positives in addition to false positives. However, this method ensures that any and every region of the image where the independent channel signal is significant is cropped and saved. Therefore, the techniques described herein are fail-safe, because they greatly overestimate the significance of independent channel regions, as many of these regions have a low-level signal that is much lower than that observed in independent channel regions that do contain cells of interest.

The sub-images created by image pre-processing module 106a are then transmitted to machine learning module 106b for classification by (trained image) classification model 108. In operation 210, machine learning module 106b executes classification model 108 using the set of sub-images to classify each sub-image into at least one of two or more categories that indicate whether the sub-image includes a cell of interest. As described above, in some embodiments classification model 108 includes a multi-level convolutional neural network (CNN) that is trained to recognize the difference between two or more categories of cells of interest. Each layer of the CNN contains a number of 2D convolutional filters (e.g., 256 filters). Each of the filters is a matrix of pixel values (e.g., 3×3) from the input sub-image. In addition, each layer contains an activation function, which may be a rectified linear unit (ReLU) activation function, and 2D max pooling (e.g., pool size 2×2). Classification model 108 processes each input sub-image to generate a classification prediction as to whether the input sub-image contains a cell of interest or not. In some embodiments, classification model 108 is configured to generate a multi-faceted classification prediction, in that the input sub-image can be classified into two or more categories (e.g., in the case of cells with multiple phenotypic characteristics). In some embodiments, the classification prediction includes a numeric value or vector that indicates the classification of the sub-image (i.e., containing cell of interest, not containing cell of interest, etc.). Referring back to FIG. 6, each sub-image is associated with a plus (+) (e.g., indicating classification model 108 classified the sub-image as containing a cell of interest) or an X (e.g., indicating that classification model 108 classified the sub-image as not containing a cell of interest). It should be appreciated that other types of classification outputs aside from those described herein can be used within the scope of the technology. Machine learning module 106b transmits classification data associated with execution of classification model 108 on the sub-images to image classification module 106c.

In operation 212, image classification module 106c stores data relating to classification of the set of sub-images by classification model 108 into one or more data stores. In some embodiments, module 106c stores the classification data based upon the corresponding classification. For example, module 106c can store one or more of the sub-images classified as containing a cell of interest in a first data store (e.g., a file folder or directory defined in image repository 110a) and module 106c can store one or more of the sub-images classified as containing a cell of interest in a second data store (e.g., a different file folder or directory in image repository 110a). As noted above, the classification data can be stored locally on server computing device 106 or in a remote data store (such as a cloud database). In some embodiments, instead of storing the sub-images directly (e.g., due to memory constraints), module 106c can store a summary of the classification results (e.g., text data) that indicates the classification value assigned to each sub-image.

Training the Classification Model

Figure 7:
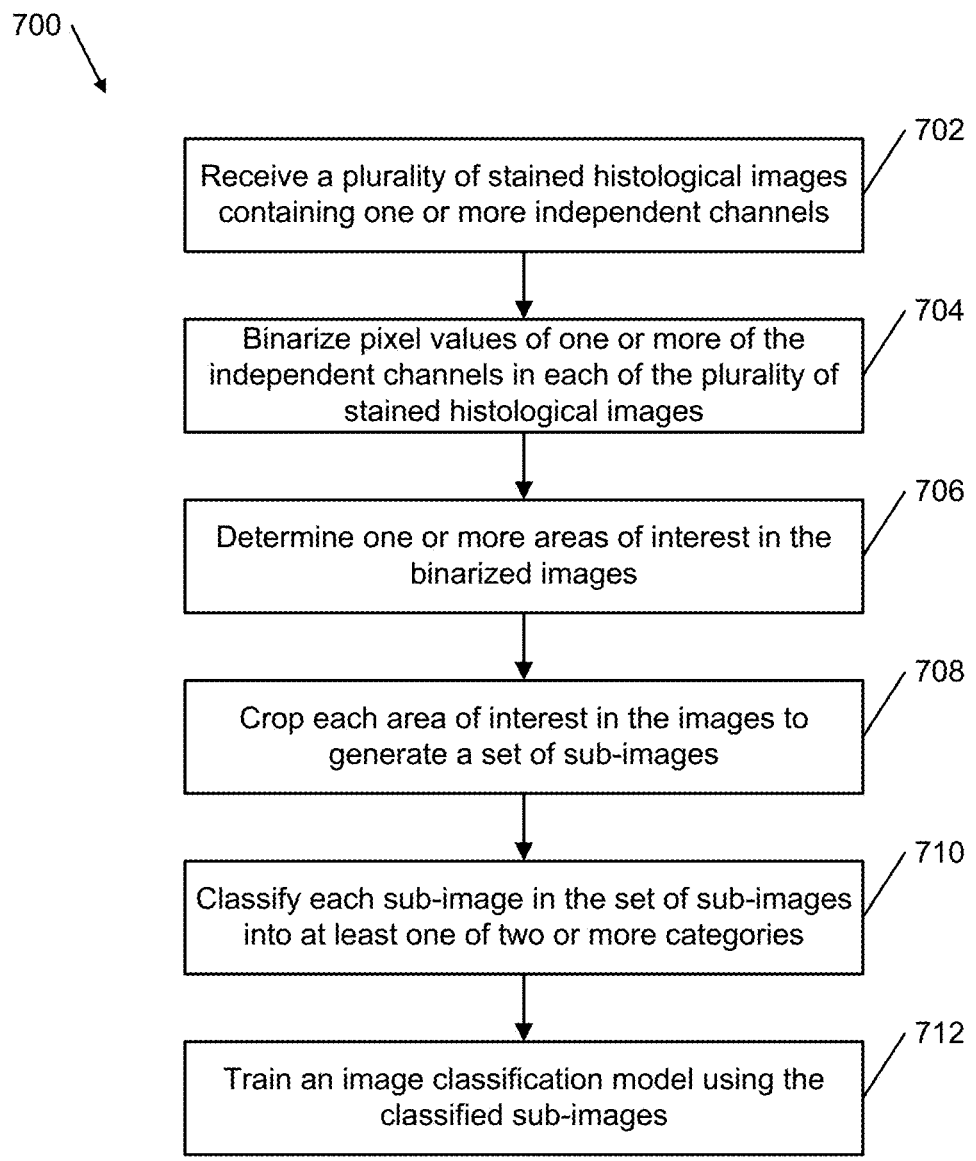
FIG. 7 is a flow diagram of a method for training an image classification model to identify a cell of interest in a plurality of stained histological images, according to an embodiment of the present invention.

The following section describes how system 100 trains classification model 108 to detect cells of interest in large image datasets. FIG. 7 is a flow diagram of a computerized method 700 for training an image classification model to identify a cell of interest in a plurality of stained histological images, using system 100 of FIG. 1, according to an embodiment of the present invention. Operations 702, 704, 706, and 708 are similar to operations 202, 204, 206, and 208 as described above, and thus many of the details are not repeated here.

In operation 702, image pre-processing module 106a receives a plurality of stained histological images containing one or more independent channels. The stained histological images may include sets of training images that, in some embodiments, are known to contain one or more cells of interest and/or known to contain zero cells of interest. In operation 710, image pre-processing module 106a binarizes pixel values of the independent channels in each stained histological image, including discrete regions of low signal-to-noise ratio in each image (as described above with respect to operation 204 of FIG. 2).

In operation 706, image pre-processing module 106a determines one or more areas of interest in the binarized images by finding pixel areas in the one or more independent channels that are connected and include an overall connected pixel area of a certain size, each area of interest defined by one or more bounding coordinates (as described above with respect to operation 206 of FIG. 2). In operation 708, image pre-processing module 106a crops each area of interest in the images based upon the bounding coordinates to generate a set of sub-images each comprising a cropped area of interest (as described above with respect to operation 208 of FIG. 2).

Then, in operation 710, each sub-image in the set of sub-images is classified into at least one of two or more categories that indicate whether the sub-image includes a cell of interest. In one example, the sub-images can be analyzed (e.g., by a trained expert) to determine whether the sub-images contain a cell of interest or not. The sub-images may then be segregated into separate training folders in image repository 110*a* based upon the analysis. For example, sub-images that are deemed to contain a cell of interest may be stored in a positive training folder, while sub-images that are deemed not to contain a cell of interest may be stored in a negative training folder. In some embodiments, sub-images that cannot be classified may be stored in a separate folder. In addition, a portion of each of the sub-images stored in the positive training folder and in the negative training folder (e.g., 25%) may be further separated into a positive validation folder and a negative validation folder, respectively. Machine learning module 106*b* does not use these validation images directly for training classification model 108, but instead uses these validation images during training to ensure that classification model 108 is not overfit.

In operation 712, machine learning module 106*b* trains an image classification model using the classified sub-images to generate a trained image classification model 108 that generates a prediction of whether one or more unclassified sub-images contains a cell of interest. In some embodiments, the untrained image classification model is provided images that have been labeled by an expert in the art (as described in the previous paragraph). It should be appreciated that the labeled images may only include a subset of the total number of images available—as the number of images available for training may be very large. A preliminary image classification model is trained on these labeled images and then used to classify the remainder of the images that were available for training. During this operation, the expert in the art may inspect the classification results and either move the trained classification model to deployment, or further curate the training data set by adding some of the misclassified images into the training pool if the classification results were suboptimal.

Untrained image classification model 108 (i.e., a multi-level CNN as described previously) uses the classified sub-images (e.g., from the positive and negative training folders) as input for training in order to recognize the difference between the two categories. During training, machine learning module 106*b* evaluates and minimizes an error function, using the validation images, that represents the accuracy of the prediction generated by classification model 108 versus the known classification (positive or negative). Once the error function plateaus, machine learning module 106*b* concludes the model training phase and classification model 108 is ready for deployment to receive unclassified sub-images as input to predict whether each sub-image contains a cell of interest.

Figure 8:
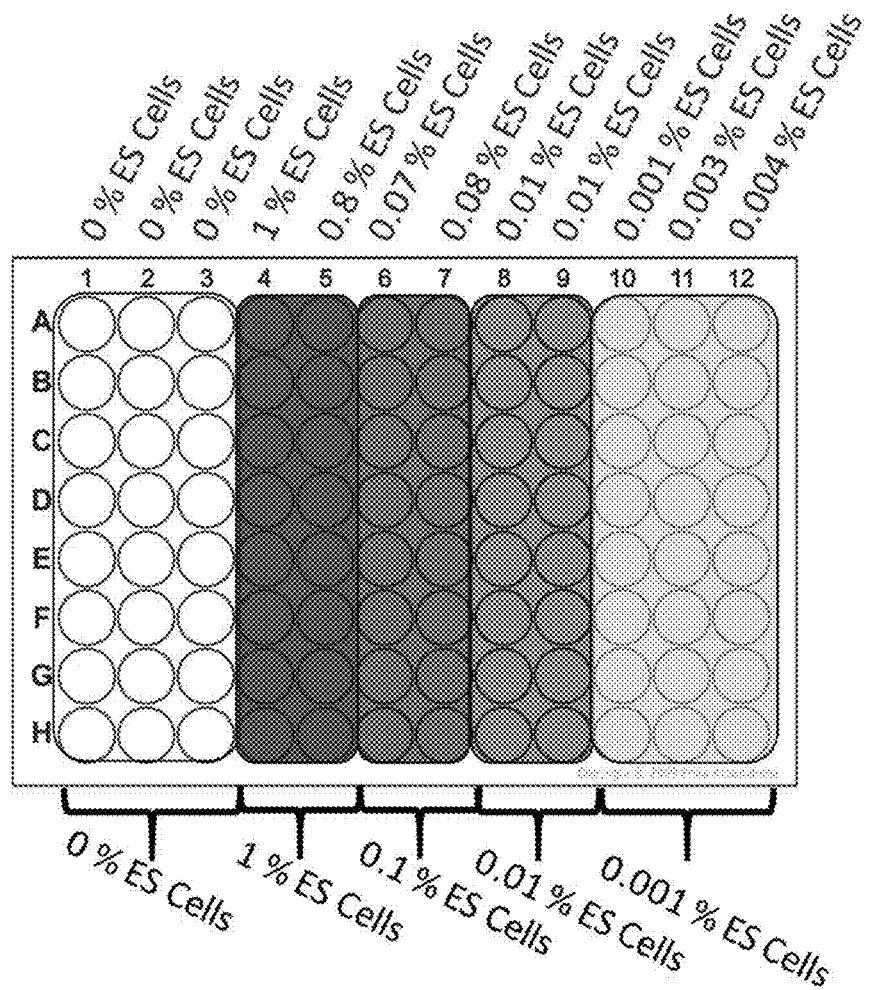
FIG. 8 is a diagram of calculated percentages of OCT4+ cells versus known PSC spike-in percentages, according to an embodiment of the present invention.

In an exemplary training process, system 100 used a subset of data from an OCT4+ spike-in experiment to train a classification model 108. Eleven hundred and five (1105) OCT4+ images and 1432 OCT4− images were used to train classification model 108, and 25% of each of the image sets were used for validation purposes as described above. After training, classification model 108 was tested on the entire spike-in experimental dataset with the goal of finding all OCT4+ cells. FIG. 8 is a diagram showing calculated percentages of OCT4+ cells versus known PSC spike-in percentages. The results shown in FIG. 8 agree very well with the known spike-in percentages. For example, the first three columns have 0% ES cells spiked in, and 0% were detected (or calculated). The next two columns have 1% ES cells spiked in, and the model calculated 1% and 0.8%, respectively. The next two columns have 0.1% ES cells spiked in, and the model calculated 0.07% and 0.08%, respectively. The next two columns have 0.01% ES cells spiked in, and the model calculated 0.01% for both columns. Finally, the last three columns have 0.001% ES cells spiked in, and the model calculated 0.001%, 0.003%, and 0.004%, respectively. In addition, classification model 108 was able to correctly identify 529 OCT4+ cells that the model had not been trained or validated on, thus demonstrating that the model was not overfit.

Autoencoder-Assisted Background Detection and Removal

Figure 9:
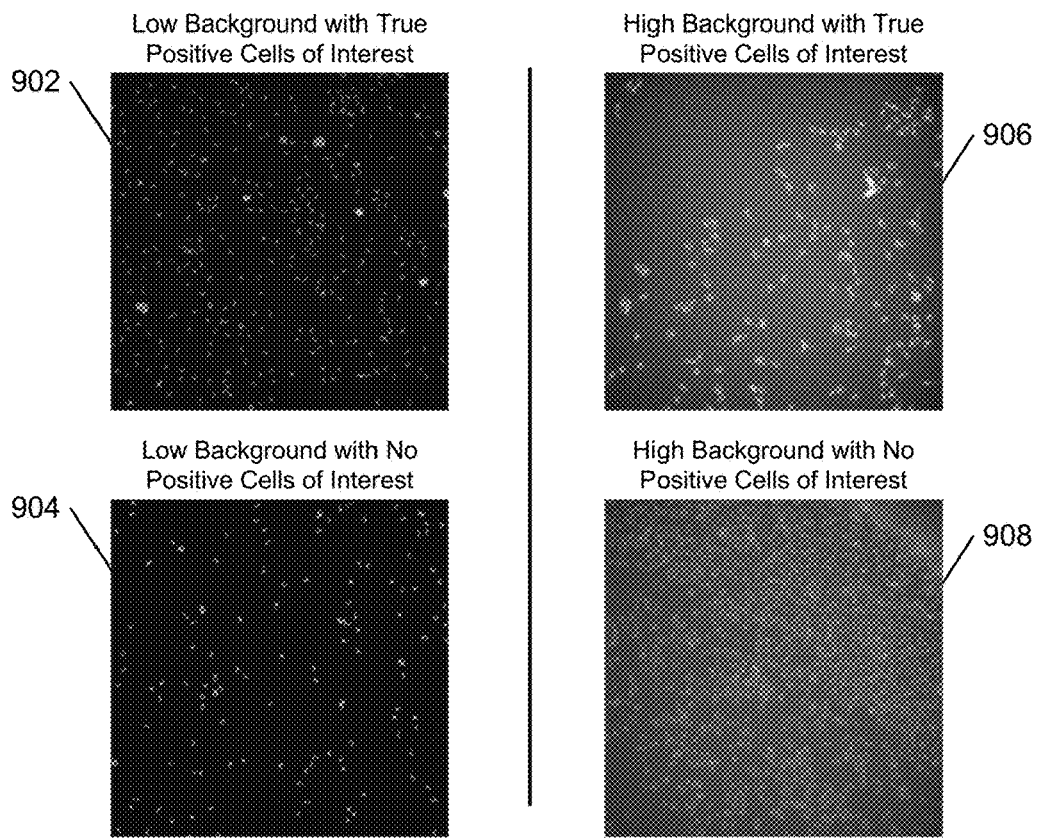
FIG. 9 depicts several stained histological images, according to embodiments of the present invention.

In some embodiments in which input image data is noisy, the image binarization and automatic cropping operations performed by image pre-processing module 106*c* (e.g., operations 204 and 208 of FIG. 2) may generate an excess of false positives or miss cropping true positives due to the excess noise. Having an excess of false positives makes the system work harder than it needs to. FIG. 9 depicts several exemplary stained histological images 902, 904, 906, 908 showing the effects of noise. Image 902 includes one or more true positive cells of interest and has low background noise, while image 904 includes no positive cells of interest and also has low background noise. In contrast, image 906 includes one or more true positive cells of interest but has high background noise, and image 908 includes no cells of interest and also has high background noise.

For noisy datasets, system 100 may implement a background subtraction operation prior to binarization and cropping of the input images. In some embodiments, machine learning module 106*b* uses a convolutional autoencoder. Specifically, an autoencoder that contains a bottleneck in the hidden layers will necessarily be forced to learn a compressed representation of the dataspace under which the autoencoder is trained. If the autoencoder is trained on images that do not contain cells of interest, the autoencoder will not be able to reconstruct the regions containing those cells efficiently. Therefore, by subtracting the autoencoder-reconstructed image from the original input image, machine learning module 106*b* can remove the background image noise while highlighting the cells of interest (and other image anomalies that are not present in the autoencoder training data). In some embodiments, different types of autoencoder architectures can be used—including but not limited to convolutional autoencoders, variational autoencoders, adversarial autoencoders, and sparse autoencoders.

Figure 10:
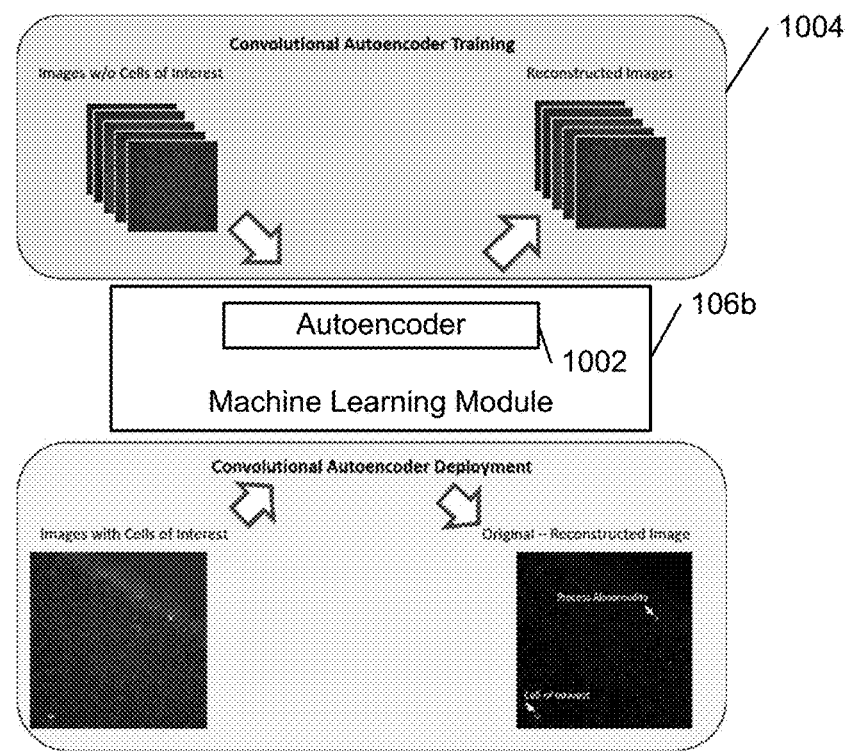
FIG. 10 is a flow diagram showing how a machine learning module can use an autoencoder to detect and remove background noise from input stained histological images, according to an embodiment of the present invention.

FIG. 10 is a flow diagram showing how machine learning module 106*b* can use an autoencoder 1002 to detect and remove background noise from input stained histological images, according to an embodiment of the present invention. The autoencoder is trained by reconstructing images that do not contain any of the cells of interest. The autoencoder effectively learns how to reconstruct background noise. More specifically, during a training phase 1004, autoencoder 1002 receives a plurality of stained histological images that do not contain any cells of interest. Autoencoder 1002 processes these input images to be able to reconstruct the input images (i.e., background signal without any cells of interest). Once the autoencoder 1002 is trained, machine learning module 106b can provide noisy input images that contain cells of interest to the autoencoder 1002, which can reconstruct the background of these images, but poorly reconstructs any anomalies not present in the training image set (i.e., cells of interest and other process-related anomalies). Then, image pre-processing module 106a can subtract the reconstructed images generated by autoencoder 1002 from the original noisy input image to generate an image that has much of the background noise eliminated yet retains the cells of interest to be further analyzed. These background-subtracted images may then be used for binarization and automatic cropping as described above.

It should be appreciated that the object detection techniques described herein are not limited to the detection of cells of interest—but can be applied to a wide range of image datasets and objects of interest, where the objects are characterized by a color and/or brightness contrast with the image background. Under these circumstances, the techniques described herein can advantageously provide an efficient and accurate mechanism to capture and classify objects of interest in large image datasets. One example is the detection and identification of objects against an image background, such as the sky. The methods and systems described herein can be used to both detect objects in the image and also to identify a type or classification for the objects (e.g., is the object a bird or a plane?). One of ordinary skill in the art can appreciate that other applications may exist within the scope of this technology.

Ensemble Learning Approach

Figure 11:
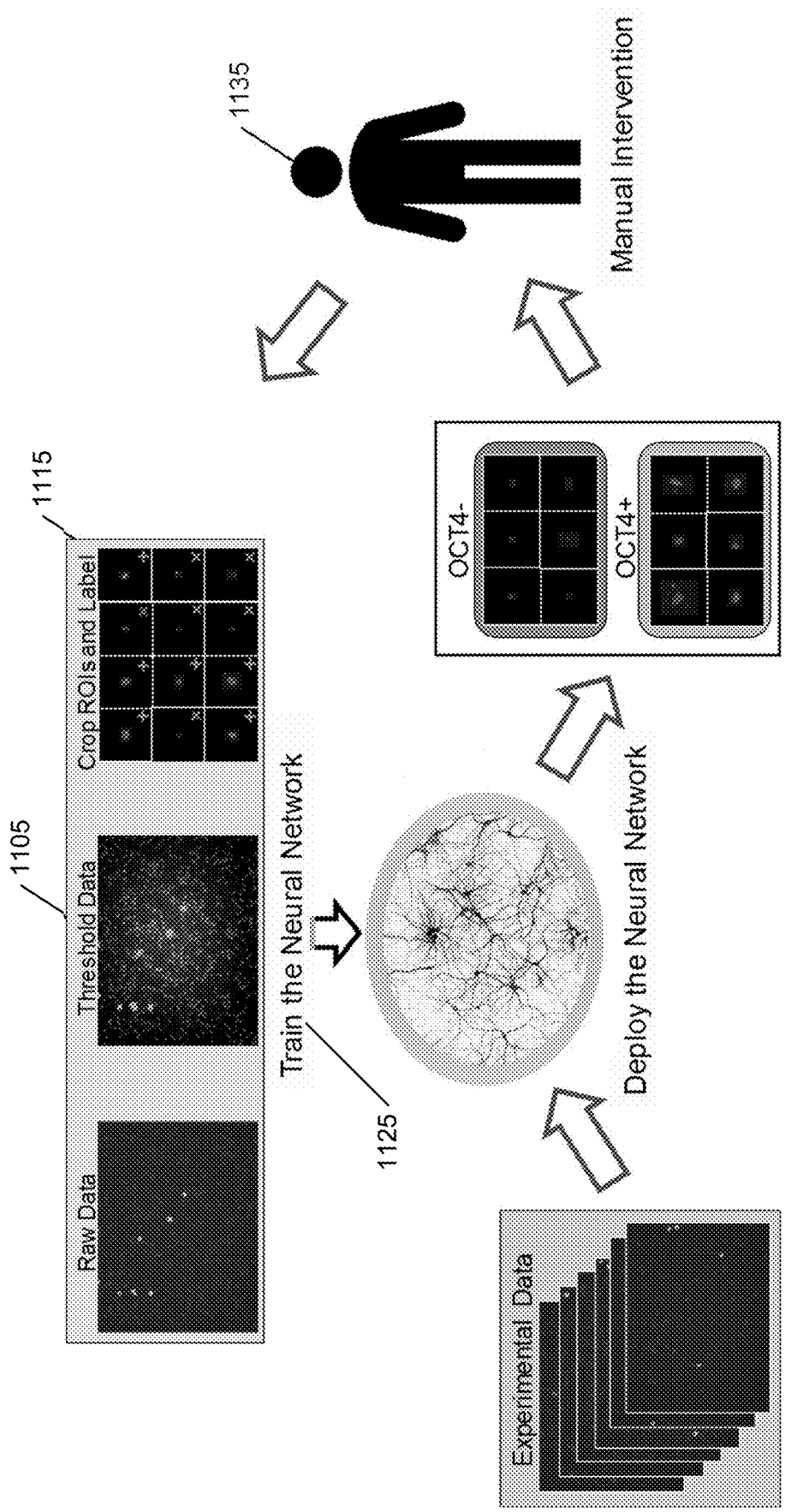
FIG. 11 is a flow diagram showing a process for detecting cells of interest using neural networks, according to an embodiment of the present invention.

In another aspect of the invention, machine learning module 106b uses an ensemble learning technique to select the classification model to be used. The overall process using this technique has some overlap with the processes outlined in FIGS. 2 and 7. The process flow, illustrated in FIG. 11, includes:
Pre-process the data by thresholding, cropping, and normalizing images (operation 1105).
Label cropped images as OCT4+ or OCT4− (operation 1115).
Train a machine learning classifier to discriminate between OCT4+ and OCT4− cells (operation 1125). This involves creating a model and curating a training set. In an ensemble approach, each of a plurality of models is trained and tested.
Manually spot-check the results for false positives and processing errors, such as plate and image duplication and thresholding inconsistencies (operation 1135).
If any issues are found, fix them and return to the pre-processing operation.
Compare the classification results to the conventional methods.
Determine a final model to include one or more of the trained models.
Deploy the final model to detect cells of interest.

One histological staining process to produce various stem cell (e.g., PSC) dilutions is performed as follows. The stem cell product is thawed and plated at 250,000 cells/cm$^2$ in 18 wells of a 24-well plate using E8 (Essential 8™) base media. Starting with a 1% spiked PSC bank, a five-step 1:10 serial dilution (0.00001%-1%) is prepared in the cell product diluted at 500,000 cells/ml, which is also prepared in E8 base media. The cell product is dispensed into the remaining wells. The cells are incubated for four hours at 37° C., in a 5% $CO_2$ atmosphere to allow the cells to attach. After this time, the cells are rinsed with D-PBS (Dulbecco's phosphate-buffered saline), and fixed with 4% PFA (paraformaldehyde) for thirty minutes. The cells are then washed with D-PBS three times and left in PBS at 4° C. overnight. The cells are next permeabilized (made permeable) using 0.3% Triton X-100 (polyethylene glycol tert-octylphenyl ether) in PBS with 1% BSA (bovine serum albumin) for 30 minutes. The OCT4 primary antibody is applied at a 1:1000 dilution in 1% BSA at 250 µl/well and incubated at room temperature for 3-4 hours with gentle shaking on a plate shaker. The cells are then washed three times with PBS at 1 ml/well using a multichannel pipette. The cells are then incubated with a fluorescent dye at a dilution of 1:2000 for one hour. This dye may be green (e.g., Alexa Fluor® 488 secondary antibodies, which absorb/emit in the green part of the spectrum, above 488 nm). In other embodiments, the dye may be red so as to minimize spectral overlap with the blue channel, described below. In those embodiments, Alexa Fluor® 647 secondary antibodies (a fluorescent dye that absorbs/emits at the far-red end of the spectrum, above 647 nm), may be used. During the last ten minutes, the cells are incubated with a blue dye at 1:10,000 dilution. The blue dye may be Hoechst 33342 dye, which is a fluorescent dye that absorbs/emits at the blue end of the spectrum, between about 350 and 461 nm, or DAPI (4',6-diamidino-2-phenylindole), which has similar absorb/emit behavior. The cells are then washed three times with PBS. If the cells are not imaged immediately, they are wrapped in parafilm and aluminum foil and stored at 4° C.

Imaging the stem cells may be performed using the PerkinElmer Operetta CLS™ High Content Analysis System. Image acquisition may be set up on the Operetta using the green (or red, as the case may be) and blue channels. The green (red) channel is selective for OCT4, whereas the blue channel is selective for all nuclei. The exposure for both channels may be adjusted based on the quality of the stain. Typical exposure time is 50 ms with 50% power for the green/red channel and 5 ms with 50% power for the Hoechst channel. The entire well is imaged at 20× magnification using a single Z plane determined experimentally to be the best in focus. Acquiring a single plate may take about four hours. The images may be analyzed using PerkinElmer's Harmony High-Content Imaging and Analysis Software. Output may be measured as percent OCT4+ cells.

Figure 12A:
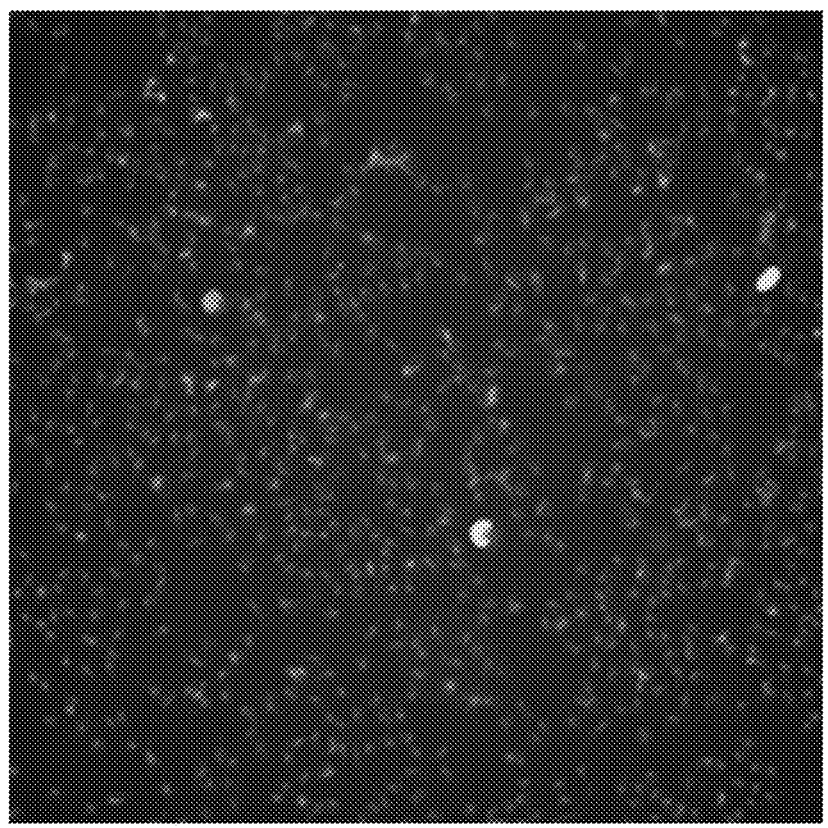
FIGS. 12A-12B are examples of images from different stages of pre-processing, according to an embodiment of the present invention.
Figure 12B:
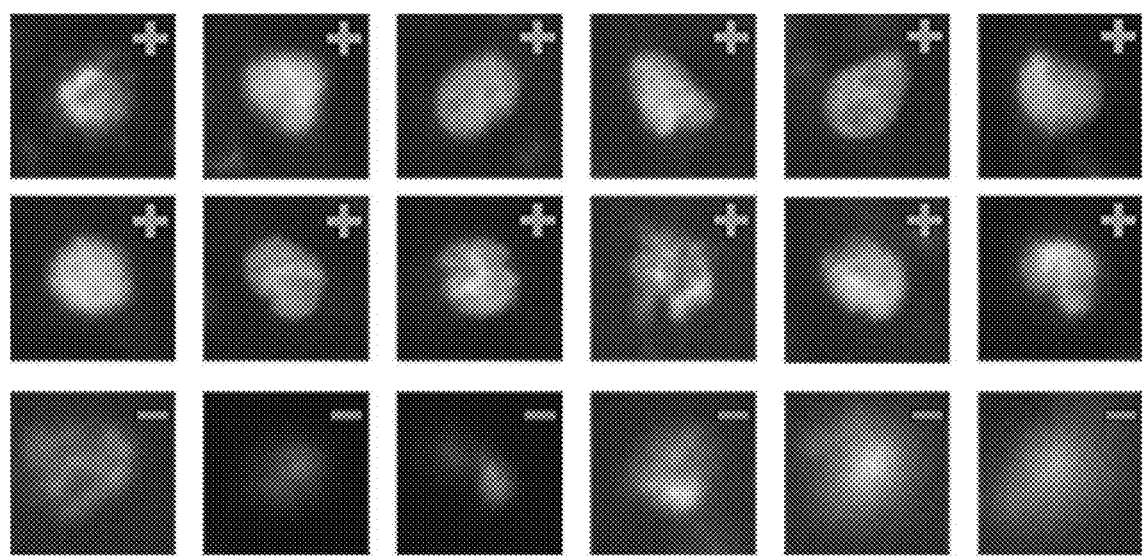

Pre-processing may be performed using image pre-processing module 106a. Images from different channels (e.g., pan-nuclear channel (for example, DAPI) and a channel of interest (for example, OCT4)) but belonging to the same field of view may be merged into a single image file and transformed into an 8-bit (.png) file format. One copy of the merged image may be further modified by eroding the pan-nuclear channel and mapping it into the unassigned channel (typically the red channel). If the eroded image is assigned to the unassigned channel, it allows for easier visualization of the nuclei as they should resemble a blue ring engulfing a red core, although this modification is not used for model training or evaluation. The result is shown in FIG. 12A. Another copy of the merged image is modified by thresholding and binarization of the OCT4+ channel. The thresholded/binarized version of the image is used for automated image cropping. Each pixel region in the OCT4+ channel that is positive (i.e., equals 255) is considered. If the region reaches a certain area range it is automatically cropped and resized (to 256×256 pixels). This process of thresholding and cropping effectively captures all OCT4+ cells plus many false positives. FIG. 12B shows both true positives (indicated with a "+" in the top right corner)—the top two rows—and false positives—the bottom row. One of the objectives of the present invention is to be able to discriminate between OCT4+ and OCT4− cells.

Figure 13:
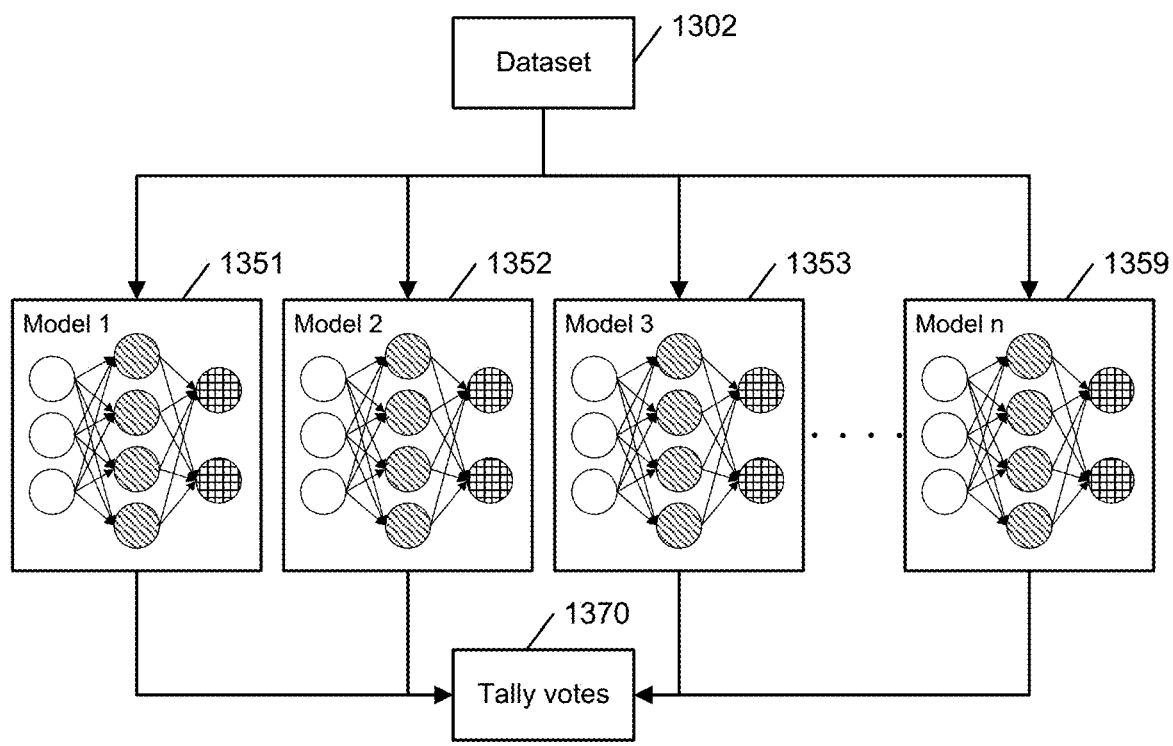
FIG. 13 is a diagram showing how an ensemble of machine learning models can be used to detect cells of interest, according to an embodiment of the present invention.

The next part of the process is to develop a classification model. In this aspect of the invention, an approach using an ensemble of machine learning models is used, as shown diagrammatically in FIG. 13. Dataset 1302, which may be a set of images, is input to an ensemble of machine learning models, 1351-1359, shown in this example as convolutional neural networks. Four models are shown, where the dotted line to the fourth model, Model n, indicates that there may be more than four models. In one embodiment, 25 models are trained (i.e., n=25), but there is no specific maximum or minimum number of models that may be trained. An ensemble of models is used because each model has its own strengths and weaknesses, and the ensemble tends to average out any one model's peculiarities. Each model makes a decision regarding each image, for example whether the image includes an OCT4+ cell or not. The votes (i.e., decisions) of each model may be combined in block 1370 so that the ensemble as a whole can make a final assessment of the image.

Figure 14A:
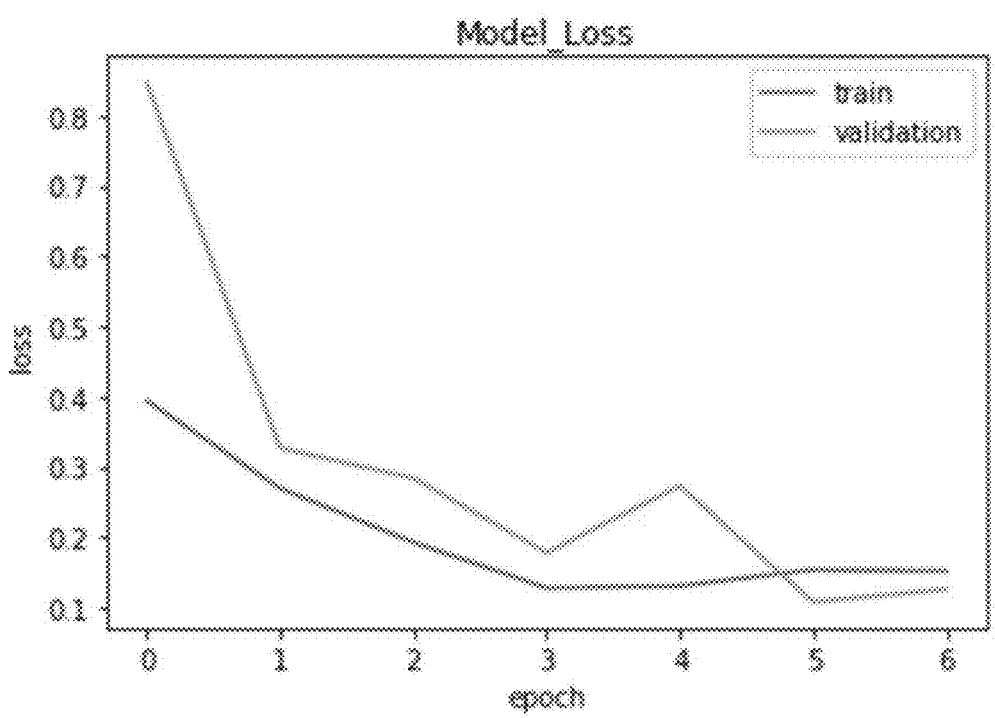
FIG. 14A is a plot of validation and training loss as a function of epochs, according to an embodiment of the present invention.

In developing machine learning models, it is best practice to split the dataset into subsets for training, validation, and testing the model. The training set is used to teach the machine how to best define a formula to discriminate between the samples in the set. The validation set is used during training as a semi-blind set that provides indicators into how well the training is going. The training process applies the formulas learned on the training set to test how well they discriminate the validation set samples. If the discrimination of the validation set is subpar, then the formulas are tweaked to try to improve its performance until a set accuracy threshold is reached. Training stops once validation loss stops improving by a certain amount over two epochs or stages, in order to prevent overfitting. FIG. 14A illustrates training and validation loss over each epoch of model training, stopping when the change in training and validation loss is minimal from one epoch to another, that is, when the two curves are relatively flat. Once the model is complete, it is applied to the testing set, which has been completely blinded from the training process thus far. The performance metrics collected from this step are used to determine how well the model performs.

Figure 14B:
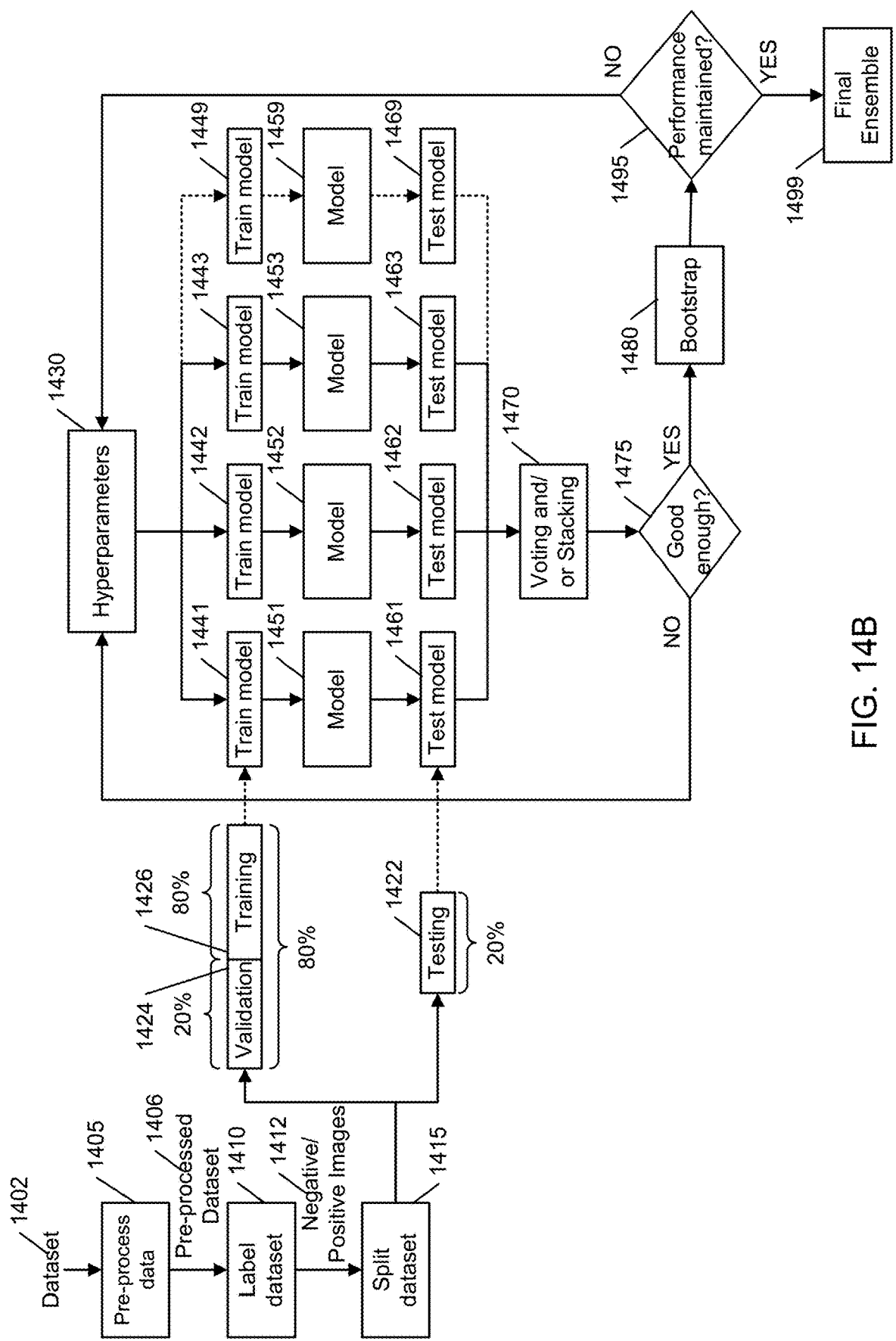
FIG. 14B is a flow diagram of a pipeline that builds and evaluates multiple models in parallel, according to an embodiment of the present invention.

A pipeline that executes this process allows building and evaluating multiple models in parallel, as shown in FIG. 14B. Dataset 1402 is pre-processed in operation 1405 as described previously to generate pre-processed dataset 1406. That dataset is labeled in operation 1410 as containing either positive or negative images, so that the accuracy can be measured later. In operation 1415, the labeled dataset is split into a testing set 1422 (~20% of the image set) and a validation/training set (~80% of the image set). The validation/training set is then split into a validation set 1424 (~20% of that latter set) and a training set 1426 (~80% of that latter set).

In the case of the present invention, the following training, validation, and test datasets were created. First, 2864 images were annotated with a POSITIVE or NEGATIVE tag, indicating whether the reviewer believed the cell positively or negatively stained for OCT4. Note that the training sets used to train the neural networks are separate from the datasets they are used to classify. Table 1 shows the breakdown of the training set by annotation.

TABLE 1

| Annotation | Count | Percentage |
|---|---|---|
| Negative | 1549 | 54.1% |
| Positive | 1315 | 45.9% |
| TOTAL | 2864 | |

Table 2 shows the breakdown of the training set by experiment.

TABLE 2

| Experiment | No. of training images | Percentage |
|---|---|---|
| PSC_EXPT_2 | 1483 | 51.8% |
| PSC_EXPT_3 | 1381 | 48.2% |
| TOTAL | 2864 | |

The annotated files were then split into training, validation, and testing datasets, as shown in Table 3. The testing set comprised 20% of the images; the validation set 20% of the remaining images, and the training set the remainder.

TABLE 3

| Dataset | No. of training images | Percentage |
|---|---|---|
| Training | 1834 | 64% |
| Validation | 457 | 16% |
| Testing | 573 | 20% |
| TOTAL | 2864 | |

The pipeline shown in FIG. 14B trains a number of models at one time that will be used to make up the ensemble. Similar to the models 1351-1359 in FIG. 13, four models 1451-1459 are shown being trained in FIG. 14B, where the dotted line to the fourth model indicates that there may be more than four models. Preferably, each model in the ensemble is a deep, convolutional neural network (CNN, sometimes called "DNN"). A convolutional neural network is good at detecting features, such as edges, in two-dimensional images to differentiate the images from each other. As mentioned above, CNN has an input layer and an output layer, as well as hidden layers in between. A CNN having two or more hidden convolutional layers is often termed "deep." Each of the convolutional layers includes a number of convolutional filters. A convolutional filter refers to a set of weights for a single convolution operation, such as edge detection. Each convolutional layer includes an activation function. In addition to convolutional layers, a CNN includes a number of dense (also called "fully connected") layers.

Building a CNN entails assigning or specifying values for model parameters (which are typically called "hyperparameters"). These hyperparameters may include the number of convolutional layers and the number of dense layers. For each of these layers, hyperparameters may include an activation function for each layer and dropout percentage. For each convolutional layer, a maximum pooling parameter may be specified. Another hyperparameter is an optimization function (or optimizer), a common example of which is a Stochastic Gradient Descent (SGD) algorithm. Other hyperparameters include training loss parameter, training loss metric, batch size, (convolutional) filter size, and target size. Other hyperparameters have sub-parameters: early stopping parameters (including patience, monitor setting, and minimum delta), reduced learning rate on plateau (including monitor setting, factor, patience, epsilon, cooldown, and minimum learning rate), and model fit parameters (including number of epochs, steps per epoch, and validation steps).

Referring back to FIG. 14B, each model is trained in operations 1441-1449 on a fraction of the data in the dataset (~64% for training and 16% for validation, in this example). Training may include moving the convolutional filters across the data, where the filters learn to take on patterns to discriminate the positive images from the negative images. Training may include modifying the weights on the filters as well as the pattern on the filter (e.g., edge filter or circular looking filter).

The validation data is tested during training to inform and avoid overfitting. After training, each model is tested in operations 1461-1469 using the testing data (~20% of the data in this example—data that were not used for training or validation). The results of the models, i.e., whether an image is positive or negative, are fed to operation 1470 and combined, and the final assessment of the data (a "decision") is produced by voting or stacking or a combination. Operation 1475 asks whether the decision is "good enough," that is, whether the ensemble produced a low enough limit of detection (LOD) for identifying the cells of interest (here, OCT4+ cells). If the LOD is low enough, then operation 1480 performs bootstrapping, which resamples the data and reevaluates the models to assess model robustness, which is another way to ensure that the ensemble has not been overfit. If after bootstrapping the ensemble maintains its performance in operation 1495, i.e., the ensemble is not overfit, then Final Ensemble 1499 is crowned. If the ensemble does not meet its prescribed LOD in operation 1475 or does not survive bootstrapping in operation 1495, then modifications are made in operation 1430 to the hyperparameters of the individual models in the ensemble, and the training and evaluation process is repeated. This process may be iterated until Final Ensemble 1499 is determined.

In one example, an ensemble of 20 different convolutional neural networks were trained using the pipeline in FIG. 14B, and performance metrics were collected on each model, as shown in Table 4.

TABLE 4

| Model No. | Sensitivity | Specificity | Accuracy | ROC_AUC |
|---|---|---|---|---|
| Model 4 | 0.980988593 | 0.987096774 | 0.984293194 | 0.997246412 |
| Model 17 | 0.977186312 | 0.983870968 | 0.980802792 | 0.997209616 |
| Model 18 | 0.977186312 | 0.987096774 | 0.982547993 | 0.994958911 |
| Model 1 | 0.97338403 | 0.993548387 | 0.984293194 | 0.995602846 |
| Model 20 | 0.97338403 | 0.987096774 | 0.980802792 | 0.995400466 |
| Model 15 | 0.97338403 | 0.987096774 | 0.980802792 | 0.994664541 |
| Model 6 | 0.97338403 | 0.983870968 | 0.979057592 | 0.994186189 |
| Model 13 | 0.97338403 | 0.990322581 | 0.982547993 | 0.993155894 |
| Model 2 | 0.969581749 | 0.980645161 | 0.97556719 | 0.996234515 |
| Model 19 | 0.969581749 | 0.983870968 | 0.977312391 | 0.995780694 |
| Model 11 | 0.969581749 | 0.987096774 | 0.979057592 | 0.994272047 |
| Model 16 | 0.969581749 | 0.974193548 | 0.972076789 | 0.994112597 |
| Model 7 | 0.969581749 | 0.987096774 | 0.979057592 | 0.993217221 |
| Model 12 | 0.969581749 | 0.983870968 | 0.977312391 | 0.992812462 |
| Model 5 | 0.965779468 | 0.993548387 | 0.980802792 | 0.994664541 |
| Model 10 | 0.958174905 | 0.987096774 | 0.97382199 | 0.994382436 |
| Model 9 | 0.946768061 | 0.990322581 | 0.970331588 | 0.991536858 |
| Model 14 | 0.935361217 | 0.990322581 | 0.965095986 | 0.992321845 |
| Model 8 | 0.931558935 | 0.964516129 | 0.94938918 | 0.990678278 |
| Model 3 | 0.931558935 | 0.935483871 | 0.933682373 | 0.979075187 |

Figure 15:
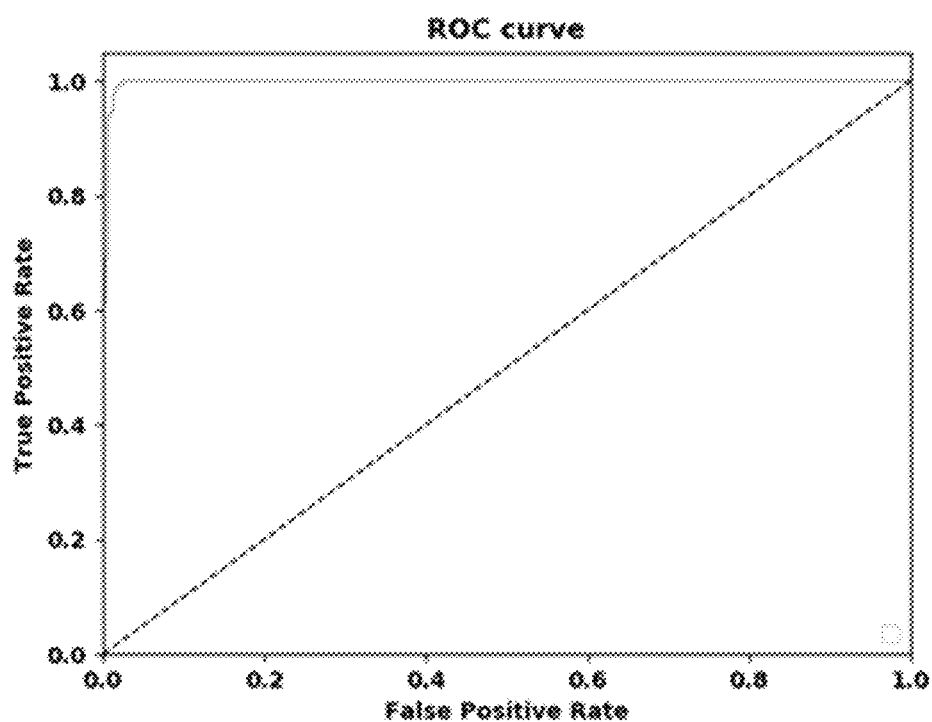
FIG. 15 is a plot of an ROC curve for one of the models in the ensemble, according to an embodiment of the present invention.

The first column, sensitivity, measures the rate of detecting true positives. Specificity measures the rate of detecting true negatives, and accuracy measures the overall rate of correct detection. ROC_AUC measures the area under the ROC (receiver operator characteristic) curve, which is a plot that illustrates the diagnostic ability of a binary classifier system as its discrimination threshold is varied. The ROC curve plots the true positive rate (sensitivity) against the false positive rate (1-specificity) at various threshold settings between 0 and 1. In Table 4, the models are listed in order of sensitivity, then in order of ROC_AUC. FIG. 15 shows the ROC curve for the model having the best accuracy, Model 4. This model also happens to have the best ROC_AUC.

The Final Ensemble may be used in a number of ways. In one embodiment, the best model from the Final Ensemble may be used to detect OCT4+ cells from the image dataset during the deployment phase. In another embodiment, if the performance of many of the models is similar, the full Final Ensemble may be used during the deployment phase, because some models may work better with different datasets. In other embodiments, more than one but less than all of the models from the Final Ensemble may be used during the deployment phase. The ones selected may be the best performing as determined by greatest accuracy, greatest ROC_AUC, or some combination of these measures and the others in Table 4.

As discussed above with respect to voting or stacking operation 1470 of FIG. 14B, the results of all of the models are combined. The aggregated data are structured where each image contains a vector of classifications from each model tested. Table 5 is the beginning portion of a larger table that records the decisions of each model for each image compared to the real answer (the "true" class, which was human-annotated during training), where 1 indicates positive and 0 indicates negative.

TABLE 5

| | True Class | Model 1 | Model 2 | Model 3 | Model 4 | ... | Model n |
|---|---|---|---|---|---|---|---|
| Image 1 | 1 | 0 | 1 | 1 | 0 | ... | 1 |
| Image 2 | 1 | 1 | 1 | 1 | 1 | ... | 0 |
| Image 3 | 1 | 1 | 1 | 1 | 1 | ... | 1 |
| Image 4 | 1 | 1 | 0 | 0 | 0 | ... | 0 |

All four images shown in Table 5 are actually positive images, as shown by the 1s in the true class column. Models 1, 2, and 3 detected three of the four images correctly (but they did not necessarily detect the same images correctly). Models 4 and n detected two of the images correctly.

As indicated in operation 1470, two different approaches on how to arrive at a final classification were taken—voting and stacking. The inventors evaluated three different voting methods and nine different stacking methods. The three voting methods were:

Hard Vote: the image is assigned the class the majority of models agree upon;

GT 75: the image is classified as "positive" if greater than 75% of models vote "positive," otherwise the image is assigned "negative"; and Max Vote: when 25 models were used, the highest level of agreement across all of the 25 models was 22, so if 22 models agreed the image was "positive," the image was classified as "positive," otherwise the image is assigned "negative."

Other similar methods may be used, such as using a majority different from 75% (e.g., 60%, 80%, 95%, etc.).

Table 6A shows the accuracy of these three methods, where "Max vote" is decidedly much poorer than the other two.

TABLE 6A

| Voting | |
|---|---|
| Voting Classification Method | Accuracy |
| GT_75 | 0.9785 |
| Hard Vote | 0.9773 |
| Max Vote | 0.5813 |

Stacking is when another machine learning classifier is used to assign a final class instead of a voting method. The nine stacking (classification) methods were:

Nearest Neighbors
Linear Support Vector Machine (SVM)
Radial Basis Function (RBF) SVM
Gaussian Process
Decision Tree
Random Forest
Multi-layer Perceptron (MLP)
Adaptive Boosting (AdaBoost)
Naïve Bayes Table 6B shows the accuracy of these nine methods in descending order. Note that the accuracy of all of these methods is comparable.

TABLE 6B

| Stacking | |
|---|---|
| Stacking Classification Method | Accuracy |
| Gaussian Process | 0.9822 |
| Random Forest | 0.9786 |
| MLP | 0.9786 |
| Nearest Neighbors | 0.9774 |
| Linear SVM | 0.9774 |
| Decision Tree | 0.9750 |
| Naïve Bayes | 0.9750 |
| AdaBoost | 0.9727 |
| RBF SVM | 0.9715 |

Table 6C shows the accuracy of all twelve of these methods in descending order, with the voting methods underlined. Of these, the Gaussian Process is the best classification method. This is the process that will be used with the results of Table 5 to determine whether an image is positive or negative.

TABLE 6C

| Voting and Stacking | |
|---|---|
| Classification Method | Accuracy |
| Gaussian Process | 0.9822 |
| Random Forest | 0.9786 |
| MLP | 0.9786 |
| <u>GT_75</u> | <u>0.9785</u> |
| Nearest Neighbors | 0.9774 |
| Linear SVM | 0.9774 |
| <u>Hard Vote</u> | <u>0.9773</u> |
| Decision Tree | 0.9750 |
| Naïve Bayes | 0.9750 |
| AdaBoost | 0.9727 |
| RBF SVM | 0.9715 |
| <u>Max Vote</u> | <u>0.5813</u> |

The results of the methods of the present invention are compared to those achieved using the PerkinElmer Operetta to detect stem cells in rarefied and less rarefied scenarios. In a first experiment, seeding densities varied from 1% to 0.00001% (1 in 10 million). Table 7 shows seeding densities for a plate having 24 wells. Five plates were prepared.

TABLE 7

| Seeding Densities | | | | | | |
|---|---|---|---|---|---|---|
| | Column 1 | Column 2 | Column 3 | Column 4 | Column 5 | Column 6 |
| Row 1 | 1% | 0.1% | 0.01% | 0.001% | 0.0001% | 0.0001% |
| Row 2 | 0.00001% | 0.00001% | 0.00001% | 0.00001% | 0.00001% | 0.00001% |
| Row 3 | 0.00001% | 0.00001% | 0.00001% | 0.00001% | 0.00001% | 0.00001% |
| Row 4 | 0.00001% | 0.00001% | 0.00001% | 0.00001% | 0.00001% | 0.00001% |

Expected OCT4+ counts were calculated as

Seeding density*DAPI count

Figure 16A:
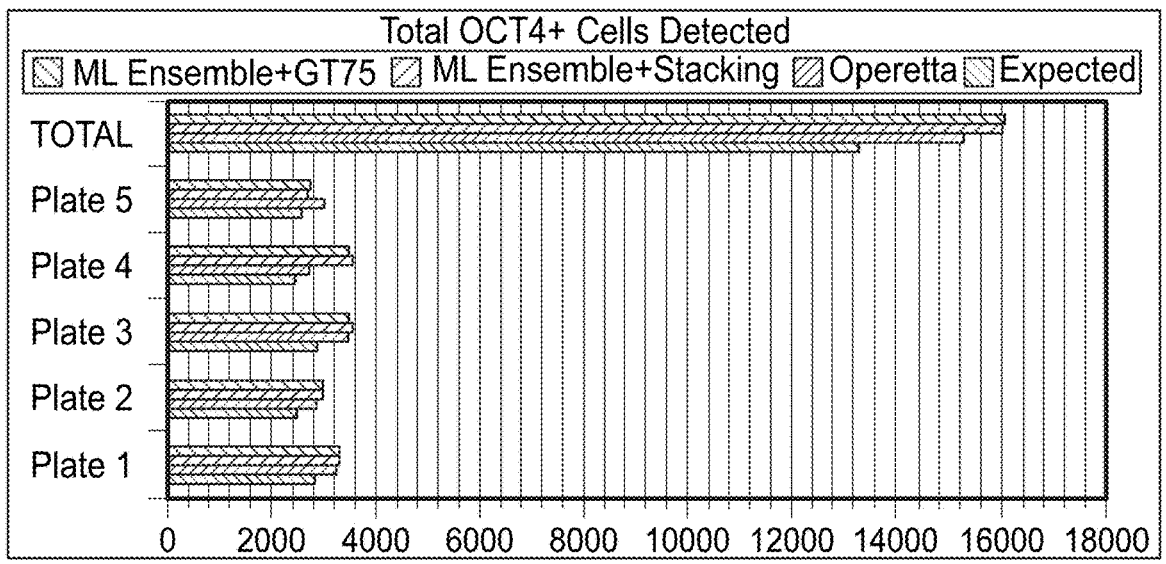
FIG. 16A-16C are graphs showing detection of OCT4+ cells by three methods compared to expected detection, at varying dilutions, according to an embodiment of the present invention.
Figure 16B:
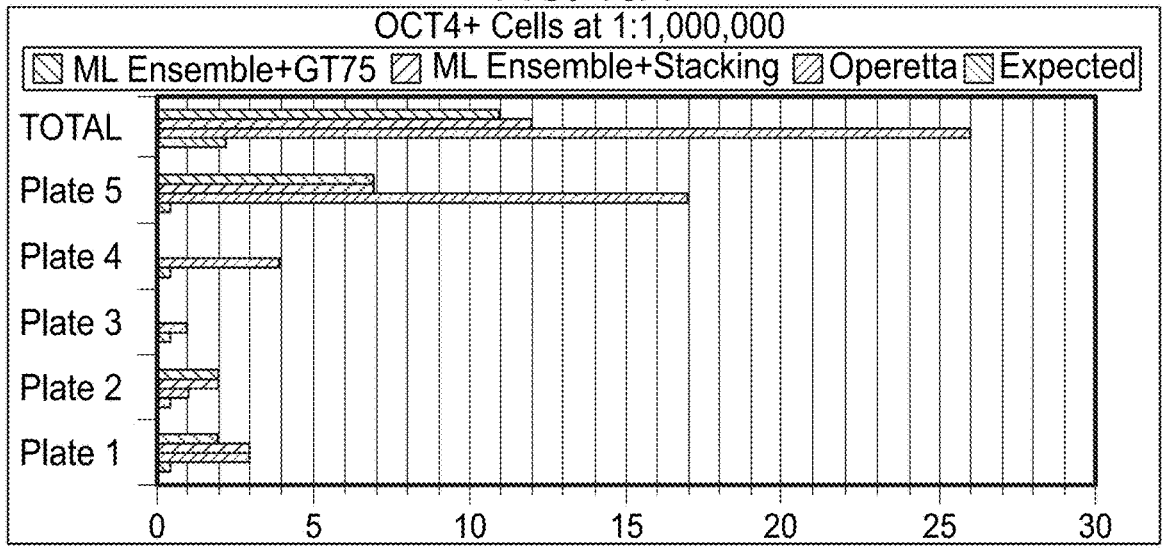
Figure 16C:
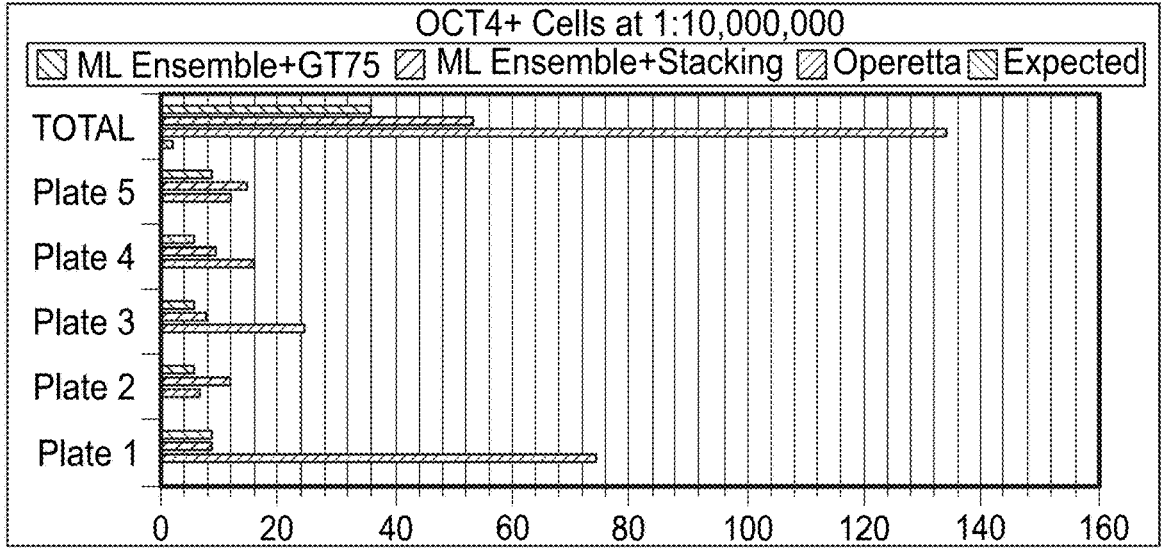

FIGS. 16A-16C show detection of OCT4+ cells by three methods compared to the expected counts. The three methods are 1) the machine learning ensemble+using GT_75 voting as a classifier, 2) the machine learning ensemble+ using Gaussian Process stacking as a classifier, and 3) the Operetta, which does not use machine learning algorithms or artificial intelligence. FIG. 16A shows total OCT4+ cells detected for all of the wells in each of five plates. Expected counts ranged from 2400 to just over 2800 for each plate, with total expected count of over 13,200. For each plate and for the total, each of the three methods overestimated the number of OCT4+ cells, but all three were comparable to the expected amounts. Overall, Operetta performed closest to expected in terms of the number of OCT4+ cells detected. More specifically, the Operetta detected 1.154× the number of expected OCT4+ cells, ML+Gaussian detected 1.210×, and ML+GT_75 detected 1.211×.

FIGS. 16B and 16C show detection of OCT4+ cells in more rarefied scenarios, 1 in 1 million (two wells—row 1, columns 5 and 6) and 1 in 10 million (18 wells—rows 2-4), respectively. In FIG. 16B, only 0.5 of a count was expected for each plate, with a total expected count of just 2.5. In plates 3 and 4, neither of the machine language ensemble techniques detected any OCT4+ cells, whereas Operetta detected 5. In plate 5, both ML techniques detected 7 cells, whereas Operetta detected 17. In plates 1 and 2, all three methods performed similarly, detecting the same number of cells or within one of each other. Overall, however, the ML techniques detected significantly fewer cells, and much closer to the expected number than Operetta. More specifically, the Operetta detected 11.5× the number of expected OCT4+ cells, ML+Gaussian detected 4.9×, and ML+GT_75 detected 4.9×. This surprising result shows the significant reduction in identifying false positives.

FIG. 16C shows similar results. The total expected count was just about 2 cells, so only about 0.4 of a count was expected for each plate. In plates 1, 3, and 4, the Operetta detected many more cells than did the ML techniques. In plates 2 and 5, all three techniques detected about the same number of cells. But overall, the ML techniques again detected significantly fewer cells, and much closer to the expected number than Operetta. More specifically, the Operetta detected 62.2× the number of expected OCT4+ cells, ML+Gaussian detected 24.9×, and ML+GT_75 detected 16.6×. This graph also shows the surprising and significant reduction in identifying false positives.

Accordingly, methods and systems have been described for detecting objects of interest in images using artificial intelligence. More particularly, these methods and systems use artificial intelligence for detecting cells of interest in large image datasets. These techniques reliably detect very low levels of cells of interest while greatly reducing the number of false positives identified. The automated method also greatly reduces the manual labor involved in analyzing images. Moreover, when applied to cell therapy products, these techniques improve the safety profile of such products because the rare cell is considered an impurity.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method operations can be performed by one or more processors executing a computer program to perform functions of the technology by operating on input data and/or generating output data. Method operations can also be performed by, and an apparatus can be implemented as, special purpose logic circuitry, e.g., an FPGA (field programmable gate array), an FPAA (field-programmable analog array), a CPLD (complex programmable logic device), a PSoC (Programmable System-on-Chip), an ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by a transmission medium, which can include any form or medium of digital or analog data communication (e.g., a communication network). The transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN (High Performance Radio LAN)), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A method for selecting a final model for detecting one or more cells of interest in image datasets, the method comprising:
dividing a curated image dataset into a training set, a validation set, and a testing set, wherein each image in the curated image dataset has been labeled as positive or negative for a cell of interest;
training each model of an ensemble of deep convolutional neural networks using the training and validation sets by evaluating and minimizing an error function that represents the accuracy of the prediction generated by each model versus the label;
testing each model of the ensemble using the testing set;
combining the predictions of the ensemble to make a combined prediction;
comparing the combined prediction to the label;
determining whether the combined prediction satisfies a pre-determined level of detection;
if the combined prediction satisfies the pre-determined level of detection, outputting the ensemble as a final ensemble; and
if the combined prediction does not satisfy the pre-determined level of detection, modifying at least one hyperparameter of at least one of the models of the ensemble until the combined prediction satisfies the pre-determined level of detection,
wherein the one or more cells of interest comprises one or more cells expressing one or more pluripotency-associated marker.

2. The method of claim 1, wherein prediction accuracy is measured for each model, and the final model comprises the model from the final ensemble having the greatest prediction accuracy.

3. The method of claim 1, wherein area under a receiver operator characteristic (ROC) curve is measured for each model, and the final model comprises the model from the final ensemble having the greatest area under the ROC curve.

4. The method of claim 1, wherein the cell of interest appears in less than about 1 in 10 million of a total number of cells.

5. The method of claim 1, wherein the cell of interest comprises multiple phenotypic characteristics.

6. The method of claim 1, wherein the cell of interest comprises an OCT4+ cell or an OCT4− cell.

7. The method of claim 1, wherein combining the predictions of the ensemble to make a combined prediction comprises using a voting technique, a stacking technique, or both techniques.

8. The method of claim 7, wherein the voting technique comprises selecting the decision made by greater than about 75% of the models.

9. The method of claim 7, wherein the stacking technique comprises a Gaussian process classifier or a random forest classifier.

10. The method of claim 1, further comprising deploying the final model along with a voting technique or a stacking technique having the greatest accuracy during model selection to detect the cell of interest.

11. The method of claim 1, wherein each deep convolutional neural network of the ensemble comprises a plurality of layers, each layer comprising a plurality of 2D convolutional filters and each 2D convolutional filter comprising a 3×3 matrix.

12. The method of claim 1, wherein each model of the ensemble includes at least one convolutional filter having a pattern, and the training comprises modifying the pattern on the filter.

13. The method of claim 1, wherein the pluripotency-associated markers comprise one or more of OCT4, Tra-1-60/81, SOX2, FGF4, and SSEA-3/4.

* * * * *